(12) United States Patent
Sivasubramanian et al.

(10) Patent No.: US 10,213,902 B2
(45) Date of Patent: Feb. 26, 2019

(54) ABRASIVE ARTICLES AND METHOD OF FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Shivshankar Sivasubramanian, Lowell, MA (US); Signo T. Reis, Rolla, MO (US); Linda S. Bateman, Spencer, MA (US); Lisa A. Johnson, Clinton, MA (US); Rachana Upadhyay, Shrewsbury, MA (US); Srinivasan Ramanath, Holden, MA (US); Ramanujam Vedantham, Shrewsbury, MA (US); Taewook Hwang, Acton, MA (US); Andrew L. Biro, Sterling, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 151 days.

(21) Appl. No.: 15/205,297

(22) Filed: Jul. 8, 2016

(65) Prior Publication Data

US 2017/0008153 A1    Jan. 12, 2017

Related U.S. Application Data

(60) Provisional application No. 62/338,309, filed on May 18, 2016, provisional application No. 62/190,056, filed on Jul. 8, 2015.

(51) Int. Cl.
  *B24D 3/02* (2006.01)
  *B24D 18/00* (2006.01)
  (Continued)

(52) U.S. Cl.
  CPC .............. *B24D 3/14* (2013.01); *B24D 18/00* (2013.01); *C03C 3/091* (2013.01); *C03C 8/02* (2013.01); *C03C 8/14* (2013.01)

(58) Field of Classification Search
  USPC .......................................... 51/307, 293, 309
  See application file for complete search history.

(56) References Cited

U.S. PATENT DOCUMENTS

2013/0203328 A1\* 8/2013 Givot .................... B24D 5/02
                                                         451/548
2014/0020304 A1    1/2014 Zuyev et al.
(Continued)

FOREIGN PATENT DOCUMENTS

EP    1598147 BI    3/2008
JP    2007290101 A    11/2007
(Continued)

OTHER PUBLICATIONS

International Search Report and Written Opinion for PCT Application No. PCT/US2016/041469, dated Oct. 21, 2016, 15 pages.

*Primary Examiner* — James E McDonough
(74) *Attorney, Agent, or Firm* — Abel Law Group, LLP; Joseph P. Sullivan

(57) ABSTRACT

An abrasive article including a body having a bond material comprising an inorganic material, abrasive particles contained within the bond materials; and pores contained within the bond material defining a porosity of at least 90 vol % and not greater than 97 vol % for a total volume of the body.

20 Claims, 11 Drawing Sheets

(51) Int. Cl.
  *B24D 3/14*    (2006.01)
  *C03C 8/14*    (2006.01)
  *C03C 8/02*    (2006.01)
  *C03C 3/091*   (2006.01)
  *B24D 3/00*    (2006.01)
  *B24D 11/00*   (2006.01)
  *C09K 3/14*    (2006.01)

(56) References Cited

U.S. PATENT DOCUMENTS

| | | | |
|---|---|---|---|
| 2014/0069021 A1 | 3/2014 | Querel et al. | |
| 2014/0182214 A1 | 7/2014 | Sivasubrarnanian | |
| 2014/0290149 A1* | 10/2014 | Vedantham | B24D 3/18 51/308 |
| 2015/0174735 A1 | 6/2015 | Upadhyay et al. | |

FOREIGN PATENT DOCUMENTS

| | | |
|---|---|---|
| TW | 201024034 A | 7/2010 |
| TW | 201334921 A | 9/2013 |
| WO | 2007047261 A1 | 4/2007 |

\* cited by examiner

ABRASIVE ARTICLES AND METHOD OF FORMING SAME

CROSS-REFERENCE TO RELATED APPLICATION(S)

The present application claims priority under 35 U.S.C. § 119(e) to U.S. Provisional Patent Application No. 62/190,056, filed Jul. 8, 2015, entitled "ABRASIVE ARTICLES AND METHOD OF FORMING SAME," naming inventors Shivshankar SIVASUBRAMANIAN et al., and claims priority under 35 U.S.C. § 119(e) to U.S. Provisional Patent Application No. 62/338,309, filed May 18, 2016, entitled "ABRASIVE ARTICLES AND METHOD OF FORMING SAME," naming inventors Shivshankar SIVASUBRAMANIAN et al., which is assigned to the current assignee hereof and incorporated by reference herein in its entirety for all purposes.

BACKGROUND

Field of the Disclosure

The following is directed to abrasive articles, and more particularly bonded abrasive articles.

Description of the Related Art

In the production of electronic devices, the back surface of a semiconductor wafer having a plurality of circuits such as IC's and LSI's is ground to a predetermined thickness by a grinding machine before it is divided into individual chips. To grind the back surface of the semiconductor wafer efficiently, a grinding machine equipped with a rough grinding unit and a finish grinding unit is generally used. Generally, the article utilize to conduct the rough grinding process is a bonded abrasive body or bond grindstone, which is obtained by bonding together diamond abrasive grains having a relatively large size with a vitrified bond or metal bond material. A resin bond grindstone having diamond abrasive grains of a median particle size of 2 microns or more contained in a resin bond is typically used for finish grinding operations. Smaller sizes of diamonds generally cannot be utilized in resin bonded articles.

The idea of high-porosity grindstones has been disclosed, but it is recognized by those of skill in the art that the creation of grindstones having such high porosities remains a challenge and there appear to be practical limitations on the formation of grindstones having porosities in excess of 90 vol %. Still, the industry continues to demand improved grindstone materials, capable of achieving improved grinding performance.

SUMMARY

According to one aspect, an abrasive article includes a body including a bond material comprising a inorganic material, abrasive particles contained within the bond materials, and pores contained within the bond material defining a porosity of at least 90 vol % and not greater than 97 vol % for a total volume of the body.

In yet another aspect, an abrasive article comprises a body including a bond material comprising an inorganic material, abrasive particles contained within the bond materials, and pores contained within the bond material defining a porosity of at least 90 vol % and not greater than 97 vol % for a total volume of the body, wherein the pores have an mean pore size of less than 100 microns.

According to yet another aspect, an abrasive article comprises a body including a bond material comprising an inorganic material, abrasive particles contained within the bond materials, and pores contained within the bond material defining a porosity of at least 90 vol % and not greater than 97 vol % for a total volume of the body, and wherein the pores define an open-to-closed ratio of at least 1.

In another aspect, an abrasive article comprises a body including a bond material comprising an inorganic material, abrasive particles contained within the bond material, and pores contained within the bond material defining a porosity of at least 70 vol % and not greater than 97 vol %, a mean pore size of not greater than 100 microns, and a first standard deviation of pore sizes of not greater than 40.

In another aspect, an abrasive article comprises a body including a bond material comprising an inorganic material, abrasive particles contained within the bond material, pores contained within the bond material defining a porosity of at least 70 vol % and not greater than 97 vol % for a total volume of the body, and a 90th percentile range extending for a range of pore sizes not greater than 30 microns.

For yet another aspect, an abrasive article comprises a body including a bond material comprising an inorganic material, pores contained within the bond material having an mean pore size of less than 100 microns, and abrasive particles in a content of not greater than 30 vol % for a total volume of the body.

According to another aspect, an abrasive article comprises a body including a bond material comprising an inorganic material including silica and a plurality of transition metal elements, a porosity of at least 70 vol % for a total volume of the body, and pores contained within the bond material having an mean pore size of less than 100 microns.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical embodiments.

DETAILED DESCRIPTION

The following includes a bonded abrasive article suitable for use in material removal applications. The bonded abrasive articles of the embodiments herein may be particularly suited for grinding materials used in fabricating sensitive electronic material, such as wafers or substrates, which may include monocrystalline or polycrystalline materials, such as sapphire, silicon, and the like. In particular instances, the abrasive articles may be in the form of bonded abrasive portions used in grindstones for backgrinding operations of semiconducting wafer materials.

Figure 1:
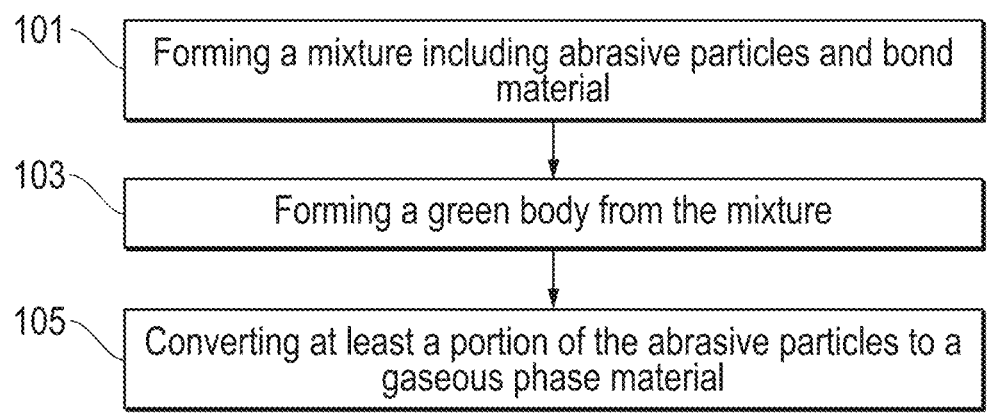
FIG. 1 includes a flow chart illustrating a method of forming a bonded abrasive article in accordance with embodiment.

FIG. 1 includes a flow chart illustrating a method of forming a bonded abrasive article in accordance with embodiment. As illustrated, the process can be initiated at step 101, by forming a mixture that can include a bond material and abrasive particles. In accordance with embodiment, the bond material may be formed of an inorganic material, and more particularly, a frit material that may form a vitreous phase material upon suitable heat-treatment. For certain embodiments, the bond material can include an oxide, and more particularly a combination of oxide compounds. Certain suitable bond materials can be silica-based materials, wherein a majority content of the material can be formed of silica ($SiO_2$).

Forming the mixture may include the provision of other materials in addition to the bond material and abrasive particles. For example, other additives such as foaming agents, binders, grinding agents, and the like may be added to the mixture. In certain instances, the mixture may include a minority content of binder, which may include an organic material, such as polyethylene glycol (PEG). Such binders may facilitate formation of the mixture into a green body. Furthermore, other materials may be added in minority amounts, including for example foaming agents, such as sodium silicate ($Na_2SiO_3$) or grinding aids such as cerium oxide ($CeO_2$).

Forming of the mixture may include a mixing process such that the components of the mixture are uniformly dispersed within each other. For example, in one embodiment, the mixture can be a wet mixture or dry mixture. One suitable process for ensuring homogeneous dispersion of the materials in the mixture can include seiving.

The abrasive particles of the mixture can include one or more types of abrasive particles. For example, the abrasive particles can include a material selected from the group of oxides, carbides, nitrides, borides, diamond, naturally occurring minerals, synthetic materials, or a combination thereof. Suitable superabrasive materials can include cubic boron nitride (cBN), diamond and a combination thereof. In a particular embodiment, the abrasive particles can consist of essentially of diamond. The diamond may be natural or synthetic. The bonded abrasive body can be essentially free of silicon carbide. Moreover, the abrasive particles can be distinct from other fillers, such as pore formers and other particulate materials within the bond material. In one particular embodiment, the abrasive particles can have a graphitized surface. For example, the abrasive particles can include diamond, wherein at least a portion of the diamond surfaces are graphitized.

In one embodiment, the abrasive particles can have a Mohs hardness of at least 6, such as at least 7, at least 8 or even at least 9. For example, the abrasive particles can have a Mohs hardness within a range between at least 6 and not greater than 10 or at least 8 and not greater than 10. In still another embodiment, the abrasive particles can have a density of at least 95% theoretical density, such as at least 96%, at least 97% or even at least 98% theoretical density.

For certain embodiments, the abrasive particles can have a particular average particle size that may facilitate improved performance of the abrasive article. For example, the abrasive particles can have an average particle size of at least 0.01 microns, such as at least 0.05 microns or at least 0.08 microns or at least 0.1 microns or at least 0.2 microns or at least 0.3 microns or a least 0.4 microns or at least 0.5 microns or at least 0.6 microns or at least 0.8 microns or at least 1 micron or at least 1.5 microns or at least 2 microns or at least 4 microns or at least 6 microns or at least 8 microns or at least 10 microns or at least 15 microns or even at least 20 microns. Still, for at least one non-limiting embodiment, the average particle size of the abrasive particles can be not greater about 200 microns, such as not great than about 100 microns, not great than about 80 microns, not greater about 60 microns, such as not great than about 40 microns, not great than about 20 microns or not greater than 10 microns or not greater than 5 microns or even not greater than 2 microns. It will be appreciated that the average particle size can be within a range between any of the minimum and maximum values provided above. Reference herein to an average particle size can also be reference to a median particle size of the first type of abrasive particle. Reference herein to an average value of any feature will be understood can also be reference to the mean value of the feature. The mean particle size of any particle herein may be measured by laser diffraction (e.g., using a Horiba LA-950) or disc centrifuge.

For one embodiment, the mixture may include more than one type of abrasive particle, including a first type of abrasive particle having a first median particle size and a second type of abrasive particle having a second median particle size. The first and second types of abrasive particles can include superabrasive materials, which may be the same or different compared to each other. Notably, the first median particle size may be different than the second median particle size, and in certain instances, the first median particle size can be greater than the second median particle size. In at least one embodiment, at least a portion, such as at least a majority or even the entire content of second type of abrasive particles may be consumed during the forming process and facilitate formation of pores within the body. Still, in at least one embodiment, only a minority of the abrasive particles, such as the second type of abrasive particles is consumed during the forming process to form a portion of the porosity within the body.

In certain instances, a majority of the second type of abrasive particle, second type of superabrasive material can have a second median particle size that may be not greater than about 1 micron. Still, in other instances, the second median particle size may be smaller, such as not great than about 0.9 microns, not greater than about 0.8 microns, not greater than about 0.7 microns, or even not great than about 0.5. Still, in one non-limiting embodiment, the second median particle size may be at least about 0.01 microns, such as at least about 0.05 microns, at least about 0.08 microns, at least about 0.01 microns, or even at least about 0.2 microns. It will be appreciated that the second median particle size can be within a range between any of the minimum or maximum values provide above.

For certain abrasive articles, the first type of abrasive particle and second type of abrasive particle can have the same composition. For example, the first type of abrasive particle can consist essentially of diamond and a second type of abrasive particle can consist of essentially of diamond. Still, in at least one non-limiting embodiment, the second type of abrasive particle can have a different composition than the first type of abrasive particle.

The mixture can include various amounts of the first type of abrasive particle material and the second type of abrasive particle. For example, in certain instances, the mixture can be formed to contain a greater content of the first type of abrasive particle than the second type of abrasive particle. According to one embodiment, the mixture can contain at least about 1.5 times greater content (wt %) of the first type of abrasive particle than the second type of abrasive particle. In yet another instance, the mixture can include at least about 1.8 times greater, such as at least about 2 times greater, at least about 2.5 times greater, at least about 3 times greater content (wt %) of the first type of the abrasive particle than the second type of the abrasive particle.

Alternatively, the mixture may contain a greater content of the second type of abrasive particle as compared to the first type of abrasive particle. For example, the mixture may be formed to include at least about 1.5 times greater content (wt %) of the second type of abrasive particle than the first type of abrasive particle. In yet another instance, the mixture can include at least about 1.8 times greater, such as at least about 2 times greater, at least about 2.5 times greater, at least about 3 times greater content (wt %) of the second type of the abrasive particle than the first type of the abrasive particle.

After forming the mixture at step 101, the process can continue at step 103, by forming a green body from the mixture. It will be appreciated that reference to a green body includes a body that is not finally-formed and may undergo further processes, such as through a firing process, such as a bisque firing or a sintering process to densify the material. In accordance with one embodiment, one suitable process of forming a green body can include a pressing operation. Certain suitable pressing operations can include cold pressing operations, and more particularly cold isostatic pressing operations. In accordance with an embodiment, the cold pressing operation can be conducted at approximately room temperature while applying a pressure to the mixture within a range of about 0.25 tons/in$^2$ (3.44 MPa) and about 10 tons/in$^2$ (137.90 MPa).

After forming a green body at step 103, the process can continue at step 105 by converting at least a portion of the superabrasive material to a gaseous phase material. In accordance with embodiment, the process of converting at least a portion of the superabrasive material to a gaseous phase material can include a firing process. Firing may include heating the green body to a particular firing temperature and holding the green body at the firing temperature to facilitate converting at least a portion of the superabrasive material to a gaseous phase material. In one embodiment, the firing temperature can be at least about 200° C. In other embodiments, the firing temperature may be greater, such as at least about 300° C., at least about 400° C., or even at least about 500° C. Still, in one non-limiting embodiment, the firing temperature may be not greater than about 1000° C., such as not greater than about 900° C., not greater than about 800° C., not greater than about 850° C., or even not greater than about 800° C. It will be appreciated that the firing temperature can be within a range between any of the minimum or maximum temperatures provide above.

Furthermore, the firing process may be conducted for a particular duration at the firing temperature. For example, suitable durations can include a time of not greater than about 10 hours, such as not greater than about 8 hours, not greater than about 6 hours, or even not greater than about 5 hours. Still, the firing process may be conducted such that the duration at the firing temperature may at least about 10 minutes, such as at least about 30 minutes, at least about 1 hour, or even at least about 2 hours. It will be appreciated that the duration at the firing temperature can be within a range between any of the minimum or maximum times provide above. In at least one embodiment, it is contemplated that the hold time may be as short as zero minutes, such that there is essentially no hold at a given firing temperature. For one embodiment, the ramp rate from room temperature to a first temperature below the upper-most firing temperature may be controlled to facilitate volatilization of organics. Further heating above the first temperature to the upper-most firing temperature may utilize a higher ramp rate. Cooling from the upper-most firing temperature may be controlled or uncontrolled.

Furthermore, the process of converting at least a portion of the abrasive particles, and notably the abrasive particles including superabrasive material, to a gaseous phase material can include treating the green body, particularly heat-treating the green body in a particular atmosphere. For example, the green body may undergo firing in an oxidizing atmosphere. In more particular instances, the oxidizing atmosphere may be an oxygen-rich atmosphere. In accordance with one embodiment, the oxygen-rich atmosphere can contain at least 30 vol % oxygen for the total volume of the chamber during firing. It will be appreciated that the atmosphere can be an ambient atmosphere.

In particular embodiment, the bond material can have a particular softening point temperature, which may be defined as the temperature at which the bond material has a viscosity of between about 6-9 log 10 ($\eta$, Pa·s) as measured via thermomechanical analysis (TMA). The glass transition temperature can be not greater than about 560° C. In other instances, the bond material may have a softening point temperature of not greater than about 550° C., such as not greater than about 540° C., or even not greater than about 530° C. Still, in one non-limiting embodiment, the softening point temperature of the bond material may be limited, such as that it can be at least about 200° C. or even at least about 250° C. It will be appreciated that the glass transition temperature can be within a range between any of the minimum or maximum times provide above.

During the process of converting at least a portion of the abrasive particles to a gaseous phase material, the heat treating process may be conducted at a particular temperature relative to the softening point temperature. For example, converting may be conducted such that the firing temperature can be greater than the softening point temperature of the bond material. In certain instances, the difference between the firing temperature and the softening point temperature may be set in a particular manner, such that the difference between the firing temperature and softening point temperature can be not greater than 230° C. According to another process of the embodiments herein, the difference between the firing temperature and the softening point temperature of the bond can be not greater than about 220° C., not greater than about 200° C., not greater than about 195° C., not greater than about 190° C., or even not greater than about 185° C. Still, in one non-limiting embodiment, the difference between the firing temperature and the softening point temperature of the bond may be at least about 10° C., such as at least about 20° C., at least about 50° C., at least about 100° C., at least about 120° C., or even at least about 130° C. It will be appreciated that the difference between the firing temperature and the softening point temperature may be between a range between any of the minimum and maximum temperatures provided above.

For one embodiment, the process of converting at least a portion of the superabrasive material to a gaseous phase material can include converting a portion of a diamond material to a non-diamond carbon-phase material. Suitable examples of a non-diamond carbon-phase material can include graphite.

In particular instances, the process of converting can include reducing the volume percent of abrasive particles comprising the superabrasive material within the green body by changing a portion of the superabrasive material to a gaseous phase material. In more particular instances, diamond material can be oxidized thus forming a gaseous phase material comprising oxygen, carbon, and a combination thereof. For example, the diamond can be oxidized to produce a gaseous phase material of carbon dioxide, carbon monoxide, and a combination thereof.

In particular instance, the process of converting at least a portion of the superabrasive material to a gaseous phase material can include a trapping process, wherein a portion of the gaseous phase material created from the superabrasive material can be trapped within the bond material of the green body. The trapped gaseous phase material within the green body can form pores in the body. Notably, in a particular embodiment, the process of converting, and more particularly, the process of trapping the gaseous phase material can be facilitated by conducting the converting process while a least a portion of the bond material is in a fluid state. Conducting the converting process while at least a portion of the bond material is in a fluid (e.g., liquid or low viscosity) state can facilitate capture of the gaseous phase material as bubbles within the fluid portion of the bond material, thus facilitating the formation of porosity within the bonded abrasive body. As such, the firing process can be conducted at a suitable temperature to convert at least a portion of the bond material into a liquid state while converting a portion of the superabrasive material to the gaseous phase material.

The process of converting can include converting a portion of the second type of abrasive particle, such as a superabrasive material. In particular instances, wherein the abrasive particles comprise a first type of abrasive particle and a second type of abrasive particle, the second type of abrasive particle may be preferentially oxidized over the first type of the abrasive particle. That is, for example the second type of abrasive particle having a second median particle size smaller than the first median particle size, may preferentially oxidized before the first type of abrasive particle. Thus a greater content of the second type of abrasive particle may be converted to a gaseous phase material during processing than the first type of abrasive particle.

After completing the converting process, the body may be cooled from the firing temperature to facilitate the formation of the finally-formed bonded abrasive body. It will be appreciated that further machining operations may be conducting. For example, in fact a large blank of bonded abrasive material may be formed according to the embodiment herein, which may be in the form of a brick or puck. The blank can be further processed, such as through a cutting process to extract bonded abrasive bodies of suitable dimensions.

In accordance with embodiment, the bonded abrasive body can have a significant amount of porosity. For example, the bonded abrasive body can have at least 70 vol % for the total volume of the bonded abrasive body including the volume of solid material and pore volume as measured by the Archimedes process. Still in other embodiments, the amount of porosity can be greater such as at least 73 vol % or at least 75 vol % or at least 77 vol % or at least 80 vol % or at least 83 vol % or at least 86 vol % or at least 88 vol % or at least 89 vol % or at least 90 vol % or at least 91 vol % or at least 92 vol % or at least 93 vol % or at least 94 vol % or at least 91 vol %. Still, in one non-limiting embodiment, the amount of porosity may be not greater than 97 vol %, such as not greater than 96 vol % or not greater than 95 vol % or not greater than 94 vol % or not greater than 93 vol % or not greater than 92 vol % for the total volume of the bonded abrasive body. It will be appreciated that the amount of porosity within the bonded abrasive body may be within a range including any of the minimum and maximum values provided above, including for example, within a range including at least 70 vol % and not greater than 97 vol % or at least 85 vol % and not greater than 97 vol % or at least 90 vol % and not greater than 97 vol %.

Moreover, the body of the abrasive article can have a particular size and distribution of pores that may facilitate improved performance of the abrasive article. For example, the body can include pores having an mean pore size of less than 100 microns, such as less than 95 microns or less than 90 microns or less than 85 microns or less than 80 microns or less than 75 microns or less than 65 microns or less than 60 microns or less than 50 microns or less than 45 microns or less than 40 microns or less than 35 microns. In at least one embodiment, the mean pore size can be at least 1 micron or at least 5 microns or at least 10 microns or at least 15 microns or at least 20 microns or at least 25 microns. It will be appreciated that the mean pore size within the bonded abrasive body may be within a range including any of the minimum and maximum values provided above.

Figure 7:
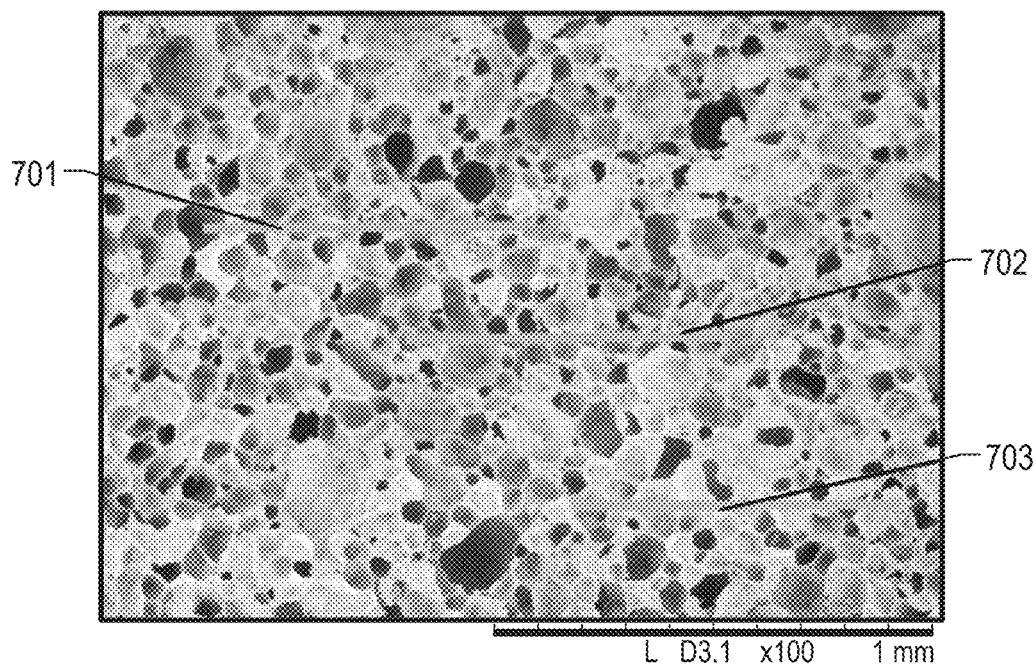
FIG. 7 includes a cross-sectional illustration of a portion of a bonded abrasive article according to an embodiment including lines used to measure pore sizes and develop a pore size distribution for the bonded abrasive article.

The porosity can be measured using a line intercept measurement method using a scanning electron microscope (SEM) photomicrograph randomly selected and representative of the abrasive article, such as illustrated in FIG. 7. A sample is prepared in a suitable manner for viewing using a SEM. The sample is viewed in backscatter mode at a magnification of 100× or other suitable magnification to ensure precise measurement of pore sizes. A first horizontal line is drawn across the image at a random location and intersecting at least 10 adjacent pores as illustrated by line 701 of FIG. 7. Using suitable image analysis software (e.g., ImageJ) the size of each of the pores is measured along the intersecting line. For example, the length of the first pore is measured as the distance along the line spanning the first pore, wherein the intersection of the bond bridges with the line 701 define the starting and stopping points, and therefore, the length of the line and the length of the first pore. The measurement is repeated for each pore intersected by the line. After all pores along the line 701 are measured, a second line 702 is drawn horizontally on the image at a random location at least 300 microns away from the first line 701 in the vertical direction. The length of each pore intersecting the line 702 is measured. The process is repeated a third time along a line 703. At least 30 total pores are measured for a sample. The pore length information is then used to calculate quantify the pore size distribution of the bonded abrasive article, which can be used to derive the mean pore size (i.e., mean pore length), first standard deviation of pore sizes, 90$^{th}$ percentile range of pore sizes, and the like.

Figure 5:
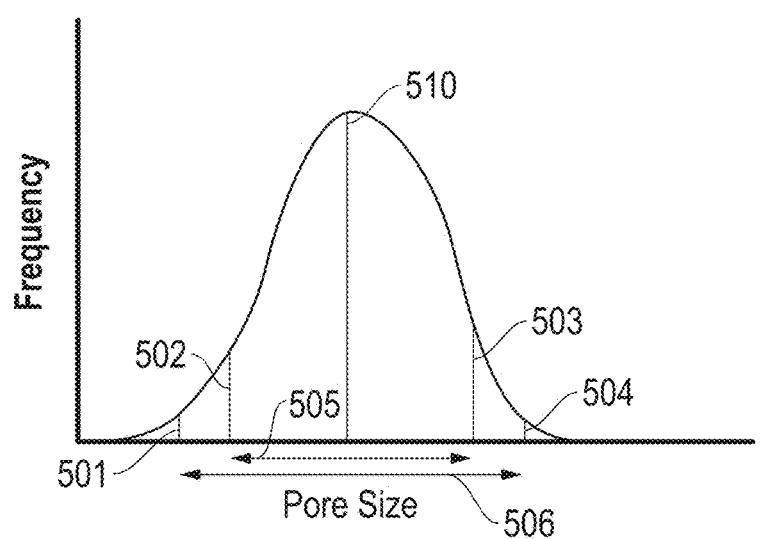
FIG. 5 includes an image of a generalized pore size distribution plot.

According to one embodiment, the porosity can define a particular standard deviation, and such porosity with such a standard deviation may be particularly useful in the abrasive article. For example, the porosity of the body can define first standard deviation of pore sizes of not greater than 100 microns. Referring to FIG. 5, a generalized pore size distribution curve is provided that a plots pore size as a function of frequency. Reference herein to the first standard deviation will be understood by those in the art to refer to a common standard deviation calculation according to standard statistical practices. In the generalized plot of FIG. 5, the standard deviation of pore sizes is represented by the distance 505 between lines 502 and 503, which are located on opposite sides of the line 510 representing the mean pore size of the distribution. In one embodiment, the first standard deviation of pores sizes for the body can be not greater than 95 microns or not greater than 90 microns or not greater than 85 microns or not greater than 80 microns or not greater than 78 microns or not greater than 75 microns or not greater than 70 microns or not greater than 60 microns or not greater than 50 microns or not greater than 40 microns or not greater than 38 microns or not greater than 36 microns or not greater than 34 microns or not greater than 32 microns or not greater than 30 microns or not greater than 28 microns or not greater than 26 microns or not greater than 24 microns or not greater than 22 microns or not greater than 20 microns or not greater than 18 microns or not greater than 16 microns. Still, in at least one non-limiting embodiment, the porosity can define a first standard deviation of pores sizes of at least 1 micron or at least 2 microns or at least 5 microns or at least 10 microns. It will be appreciated that the first standard deviation of pore sizes can be within a range including any of the minimum and maximum values noted above.

In still another embodiment, the body may include a particular type of porosity that can be defined by a 90th percentile range. Referring again to FIG. 5, the 90th percentile range of pores within the body includes a range of pore sizes surrounding the mean and excluding the lowest 5% of pore sizes in the pores size distribution and the highest 5% of pore sizes in the pore size distribution. For example, as illustrated in FIG. 5, the 90$^{th}$ percentile range of pores is represented by the pores between the line 501 and line 504 within the range 506, wherein line 501 denotes the pore sizes in the lowest 5% of pore size values and line 504 denotes the highest 5% of pore size values in the distribution. According to one embodiment, the body can have a 90th percentile range extending for a range of pore sizes of not greater than 100 microns, such as not greater than 90 microns or not greater than 80 microns or not greater than 70 microns or not greater than 60 microns or not greater than 50 microns or not greater than 40 microns or not greater than 38 microns or not greater than 36 microns or not greater than 34 microns or not greater than 32 microns or not greater than 30 microns or not greater than 28 microns or not greater than 26 microns or not greater than 24 microns or not greater than 22 microns or not greater than 20 microns or not greater than 18 microns or not greater than 16 microns or not greater than 14 microns or even not greater than 12 micron. In still another embodiment, the body can have a 90$^{th}$ percentile range of at least 1 micron, such as at least 2 microns or at least 3 microns or at least 4 microns or at least 5 microns or at least 6 microns or at least 7 microns or at least 8 microns or even at least 10 microns. It will be appreciated that the 90$^{th}$ percentile range can have a value within a range including any of the minimum and maximum values noted above, including for example, within a range including at least 1 micron and not greater than 30 microns or at least 1 micron and not greater than 20 microns.

Moreover, the pores of the body can have a particular open-to-closed ratio of at least 1, wherein the open-to-closed ratio is calculated according to the formula (Po/Pc)×100% based on the volume percent of open porosity (Po) in the body and the volume percent of closed porosity (Pc) in the body. In at least one embodiment, the open-to-closed ratio can be at least 1.05, such as at least 1.1 or at least 1.15 or at least 1.2 or at least 1.25 or at least 1.3 or at least 1.35 or at least 1.4. In certain non-limiting embodiments, the open-to-closed ratio can be not greater than 30, such as not greater than 25 or not greater than 20 or not greater than 15 or not greater than 10 or not greater than 8 or not greater than 5 or not greater than 3 or not greater than 2. It will be appreciated that the open-to-closed ratio can have a value within a range including any of the minimum and maximum values noted above, including for example, within a range including at least 1 and not greater than 30 or at least 1 micron and not greater than 10. The combination of such high values of porosity combined with the particular values of open-to-closed ratio is notable and may facilitate improved performance of the abrasive article.

In one embodiment, the bonded abrasive body can have a generally Gaussian pore size distribution as defined by a plot of mean pore size versus frequency. In yet another embodiment, body can have non-Gaussian distribution of pore sizes, such that a plot of mean pore size versus frequency demonstrates a non-Gaussian curve, such as a multimodal pore size distribution.

Furthermore, the bonded abrasive body may have a particular content of abrasive particles. For example, the bonded abrasive body may contain at least 5 vol % abrasive particles for the total volume of the solid portion of the bonded abrasive body (i.e., abrasive particles and bond, but not the porosity). In other instances, the amount of the abrasive particles within the bonded abrasive body can be greater, such as at least 10 vol % or at least 14 vol % or at least 16 vol % or at least 18 vol % or at least 20 vol % or at least 22 vol % or at least 24 vol % or at least 26 vol % or at least 28 vol % or at least 30 vol % for the total volume of the solid portion of the body. Still, in at least one non-limiting embodiment, the total amount of abrasives particles within the solid portion of the bonded abrasive body can be not greater than 50 vol %, such as about not greater than 45 vol % or not greater than 40 vol % or not greater than 35 vol % or not greater than 30 vol % or not greater than 28 vol % or not greater than 26 vol % or not greater than 24 vol % or not greater than 22 vol % or not greater than 20 vol % or not greater than 18 vol % for the total volume of solid portion of the bonded abrasive body. It will be appreciated that the total amount of abrasive particles within the bonded abrasive body can be within a range including any of the minimum and maximum percentages provided above.

Furthermore, according to embodiments herein the bonded abrasive body can contain a particular amount of bond material, which can facilitate improved performance of the abrasive article. For example, the body can contain at least 40 vol % bond material for the total volume of the solid portion of the bonded abrasive body. In other instances, the bonded abrasive body can contain a higher content of bond material such as at least 50 vol %, such as at least 60 vol %, at least about 70 vol %, at least about 75 vol % or even at least about 80 vol %. Still, according to one non-limiting embodiment, the amount of bond material within the solid portion of the bonded abrasive body can be not greater than 99 vol %, such as not greater than 97 vol %, such as not greater than 95 vol % or not greater than about 93 vol %, or even not greater than about 90 vol %. It will be appreciated that the amount of bond material within the solid portion of the bonded abrasive body can be within a range including any of the minimum and maximum percentages provided above.

The bonded abrasive body may contain a certain content of filler material. Certain suitable fillers can include compounds having elements such as sodium, cerium, and a combination thereof. In a particular embodiment, the boded abrasive body can have a content of cerium oxide ($CeO_2$) of at least about 0.4 vol % for the total volume of solid components in the bonded abrasive body excluding the volume of porosity. In other embodiments the content of cerium oxide may be greater, such that it is at least about 0.8 vol % or even at least about 1 vol %. Still, according to one non-limiting embodiment, the content of cerium oxide within the body can be limited, such that it may be not greater than about 6 vol % or not greater 4 vol %. It will be appreciated that the amount of cerium oxide within the body can be within a range within any of the minimum and maximum percentages noted above. In at least one embodiment, the body can be essentially free of cerium oxide.

The bonded abrasive body may further contain specific content of sodium silicate ($Na_2SiO_3$). For example, the bonded abrasive body can contain at least about 1 vol % sodium silicate for the total volume of solid components of the bonded abrasive body. In another embodiment, the amount of sodium silicate within the bonded abrasive body may be greater, such as at least about 2 vol %, at least about 3 vol % at least about 4 vol %, or even at least about 5 vol %. Still, in a particular non-limiting embodiment, the amount of sodium silicate within the bonded abrasive body may be not greater than about 12 vol %, such as not greater than 10 vol %, or even not greater than 9 vol %. It will be appreciated that the bonded abrasive body may contain a content of sodium silicate within a range between any of the minimum and maximum percentages noted above. In at least one embodiment, the body can be essentially free of sodium silicate.

Additionally, in specific instances the bonded abrasive body may be formed such that it contains limited amounts of free metal elements. For example the bottom abrasive body may contain not greater than about 1 wt % free metal elements for the total weight of the body. In other instances, the content of free metal elements may be less, such as not greater than about 0.5 wt %, not greater than about 0.1 wt %, or even not greater than about 0.05 wt %. In specific instances, the bonded abrasive body may be essentially free of free metal elements. Such compositions may facilitate use of the bonded abrasive body in grinding of sensitive electronic component. Reference herein to a composition that is essentially free of a material, is reference to a composition that includes not greater than 0.05 wt % of the material.

In accordance with an embodiment, the bond material may have a specific composition facilitating the formation of the bonded abrasive body in accordance with the processes described herein. For example, the bond material can be a vitreous phase material, polycrystalline material, monocrystalline material, or a combination thereof. In more particular instances, the bond material can include an oxide compound. Moreover, for at least one embodiment, the bond material can be essentially free of a metal material or organic material, such as a resin.

More particularly, the bond material may include a certain content of silica, which may facilitate improved formation and performance of the bonded abrasive. For example, the bond material can include silica ($SiO_2$) in an amount of at least 40 wt % for a total weight of the bond material, such as at least 45 wt % or at least 50 wt % or at least 52 wt % or at least 54 wt % or at least 56 wt % or at least 58 wt % or at least 60 wt %. Still, in another non-limiting embodiment, the bond material can include not greater than 80 wt % for a total weight of the bond material, such as not greater than 75 wt % or not greater than 70 wt % or not greater than 68 wt % or not greater than 66 wt % or not greater than 64 wt % or not greater than 62 wt %. It will be appreciated that the content of silica within the bond material can be within a range between any of the minimum and maximum percentages noted above. Moreover, reference herein to any material or compound within the bond material is reference to the content of the material or compound in the mixture used to form the bond and/or the content of the material or compound in the finally-formed bond material of the bonded abrasive body.

Additionally, the bond material may contain a specific content of alumina ($Al_2O_3$), which may facilitate improved formation and performance of the bonded abrasive body. For example, the bond material may contain at least 0.2 wt % alumina for a total weight of the bond material, such as at least 0.4 wt % or at least 0.6 wt % or at least 0.8 wt % or even at least 1 wt %. In one non-limiting embodiment, the amount of alumina may be not greater than 10 wt % for a total weight of the bond material, such as not greater than 8 wt % or not greater than 6 wt % or not greater than 5 wt % or not greater than 4 wt % or not greater than 3 wt % or not greater than 2 wt %. It will be appreciated that the amount of alumina within the bond material may be within a range including any of the minimum and maximum percentages noted above.

Furthermore, the bond material may include a specific content of boron oxide ($B_2O_3$), which may facilitate improved formation and performance of the bonded abrasive body. For example, in one embodiment the bond material may include at least 2 wt % boron oxide for a total weight of the bond material, such as at least 4 wt % or at least 6 wt % or at least 8 wt % or at least 10 wt % or at least 12 wt %. Still, in one non-limiting embodiment, the amount of boron oxide within the bond material may be not greater than 25 wt % for a total weight of the bond material, such as not greater than 18 wt % or not greater than 16 wt % or not greater than 15 wt % or even not greater than 14 wt %. It will be appreciated that the bond material may contain a content of boron oxide within a range including any of the minimum and maximum percentages noted above.

According to one embodiment, the bond material can include at least one alkali metal-containing oxide compound, which may facilitate improved formation and/or performance of the abrasive article. Some suitable alkali metal-containing oxide compounds can include potassium oxide, sodium oxide, lithium oxide, rubidium oxide, cesium oxide, or a combination thereof.

In one instance, the bond material can include a total content of the at least one alkali-metal containing oxide compound (i.e., one or more) of at least 2 wt % for a total weight of the bond material, such as at least 4 wt % or at least 6 wt % or at least 8 wt % or at least 10 wt % or even at least 12 wt %. Still, in one non-limiting embodiment, the total content of the at least one alkali-metal containing oxide compound within the bond material may be not greater than 25 wt % for a total weight of the bond material, such as not greater than 18 wt % or not greater than 16 wt % or not greater than 15 wt % or not greater than 14 wt % or not greater than 12 wt %. It will be appreciated that the bond material may contain a content of the at least one alkali-metal containing oxide compound within a range including any of the minimum and maximum percentages noted above.

Moreover, it will be appreciated that the bond material can include more than one alkali-metal containing oxide compound. For example, in at least one embodiment, the bond material can include potassium oxide, sodium oxide, and lithium oxide. In certain instances, the bond material can include a greater content of potassium oxide than a content of lithium oxide. In certain other instances, the bond material can include a greater content of sodium oxide than a content of lithium oxide. In still other embodiments, the bond material can include a greater content of sodium oxide than a content of potassium oxide.

According to one embodiment, the bond material may be formed to have a particular content of potassium oxide ($K_2O$), which may facilitate formation and/or performance of the abrasive article. For example, the bond material can include at least 0.5 wt % potassium oxide for a total weight of the bond material, such as at least 0.8 wt % or at least 1 wt % or at least 1.5 wt % or at least 2 wt % or at least 3 wt % or even at least 4 wt %. Still, in one non-limiting embodiment, the bond material may include a total content of potassium oxide of not greater than 10 wt % for a total weight of the bond material, such as not greater than 8 wt % or not greater than 6 wt % or even not greater than 5 wt %. It will be appreciated that the amount potassium oxide within the bond material may be within a range including any of the minimum and maximum percentages noted above.

In yet another aspect, the bond material may be formed to have a particular content of sodium oxide ($Na_2O$), which may facilitate formation and/or performance of the abrasive article. For example, the bond material can include a total content of sodium oxide of at least 0.5 wt % for a total weight of the bond material, such as at least 0.8 wt % or at least 1 wt % or at least 1.5 wt % or at least 2 wt % or at least 3 wt % or at least 4 wt % or at least 5 wt % or at least 6 wt % or at least 7 wt % or at least 8 wt % or even at least 9 wt %. In yet one non-limiting embodiment, the bond material can have a total content of sodium oxide of not greater than 20 wt % for a total weight of the bond material, such as not greater than 18 wt % or not greater than 16 wt % or not greater than 14 wt % or not greater than 12 wt % or not greater than 10 wt %. It will be appreciated that the amount sodium oxide within the bond material may be within a range including any of the minimum and maximum percentages noted above.

According to another embodiment, the bond material may be formed to have a particular content of lithium oxide ($Li_2O$), which may facilitate formation and/or performance of the abrasive article. For example, the bond material can include a total content of lithium oxide of at least 0.2 wt % for a total weight of the bond material, such as at least 0.3 wt % or at least 0.4 wt % or even at least 0.5 wt %. In one non-limiting embodiment, the bond material can include a total content of lithium oxide of not greater than 8 wt % for a total weight of the bond material, such as not greater than 6 wt % or not greater than 4 wt % or not greater than 2 wt % or not greater than 1.5 wt % or even not greater than 1 wt %. It will be appreciated that the amount lithium oxide within the bond material may be within a range including any of the minimum and maximum percentages noted above.

In one instance, the bond material can include a total content of the at least one alkaline earth metal-containing oxide compound (e.g., one or more of CaO, MgO, BaO, etc.) of at least 0.05 wt % for a total weight of the bond material, such as at least 0.06 wt % or at least 0.08 wt % or at least 0.1 wt % or at least 0.12 wt % or even at least 0.15 wt %. Still, in one non-limiting embodiment, the total content of the at least one alkaline earth metal-containing oxide compound within the bond material may be not greater than 5 wt % for a total weight of the bond material, such as not greater than 2 wt % or not greater than 1.5 wt % or not greater than 1.2 wt % or not greater than 1.1 wt % or not greater than 1 wt %. It will be appreciated that the bond material may contain a content of the at least one alkaline earth metal-containing oxide compound within a range including any of the minimum and maximum percentages noted above.

In at least one embodiment, the bond material can include calcium oxide, magnesium oxide, and barium oxide. In certain instances, the bond material can include a greater content of calcium oxide than a content of barium oxide. In certain other instances, the bond material can include a greater content of calcium oxide than a content of magnesium oxide. In still other embodiments, the bond material can include a greater content of magnesium oxide than a content of barium oxide.

For certain embodiments, the bond material may contain a specific amount of calcium oxide (CaO). For example, the bond material may contain not greater than about 2 wt % calcium oxide for a total weight of the bond material, such as not greater than about 1.6 wt %, not greater than 1.3 wt %, or even not greater than about 1 wt % calcium oxide for the total content of moles in the bond material. In at least one non-limiting embodiment, the amount of calcium oxide within the bond material can be at least 0.05 wt % or even 0.08 wt %. It will be appreciated that the amount of calcium oxide within the bond material can be within a range including any of the minimum and maximum percentages noted above.

The bond material may include a particular content of barium oxide (BaO). For example, the bond material may be formed to have at least about 0.01 wt %, such as at least about 0.02 wt %, or even at least 0.03 wt % barium oxide for the total weight of the bond material. However, in one non-limiting embodiment, the amount of barium oxide may not greater than 0.2 wt % or even not greater than about 0.1 wt %. It will be appreciated that the bond material may contain an amount of barium oxide within a range including any of the minimum and maximum percentages noted above.

The bond material may include a particular content of magnesium oxide (MgO). For example, the bond material may be formed to have at least about 0.01 wt %, such as at least about 0.02 wt %, or even at least 0.03 wt % magnesium oxide for the total weight of the bond material. However, in one non-limiting embodiment, the amount of magnesium oxide may not greater than 0.2 wt % or even not greater than about 0.1 wt %. It will be appreciated that the bond material may contain an amount of magnesium oxide within a range including any of the minimum and maximum percentages noted above.

According to yet another embodiment, the bond material may include a particular content of one or more transition metal element-containing oxide compounds, which may facilitate improved formation and/or performance of the abrasive article. Notably, without wishing to be tied to a particular theory, it is thought that certain contents and combinations of transition metal element-containing oxide compounds may facilitate formation of abrasive articles of the embodiments herein having the particular microstructural features as disclosed herein. In at least one embodiment, the bond material includes at least two transition metal element-containing oxide compounds. In still another embodiment, the bond material can include at least three transition metal element-containing oxide compounds.

For one embodiment, the bond material can include cobalt oxide, copper oxide, manganese oxide, and nickel oxide. In at least one instance, the bond material can include a greater content of cobalt oxide than a content of copper oxide. According to another embodiment, the bond material can include a greater content of cobalt oxide than a content of nickel oxide. In yet another aspect, the bond material can include a greater content of nickel oxide than a content of copper oxide. For at least one embodiment, the bond material can include a greater content of manganese oxide than a content of copper oxide. Still, according to another embodiment, the bond material can include a greater content of manganese oxide than a content of cobalt oxide. In yet other embodiments, the bond material can include a greater content of manganese oxide than a content of nickel oxide.

In one aspect, the bond material may be formed to have a particular content of cobalt oxide which may facilitate formation and/or performance of the abrasive article. For example, the bond material can include a total content of cobalt oxide of at least 0.2 wt % for a total weight of the bond material, such as at least 0.4 wt % or at least 0.6 wt % or at least 0.8 wt % or at least 1 wt % or at least 1.2 wt % or even at least 1.4 wt %. In one non-limiting embodiment, the bond material can include a total content of cobalt oxide of not greater than 10 wt % for a total weight of the bond material, such as not greater than 8 wt % or not greater than 6 wt % or not greater than 5 wt % or not greater than 4 wt % or not greater than 3 wt % or even not greater than 2 wt %. It will be appreciated that the amount cobalt oxide within the bond material may be within a range including any of the minimum and maximum percentages noted above.

For another aspect, the bond material may be formed to have a particular content of copper oxide which may facilitate formation and/or performance of the abrasive article. For example, the bond material can include a total content of copper oxide of at least 0.2 wt % for a total weight of the bond material, such as at least 0.25 wt % or at least 3 wt % or at least 0.35 wt % or at least 0.4 wt % or at least 0.45 wt % or at least 5 wt % or at least 0.55 wt % or even at least 0.6 wt %. In one non-limiting embodiment, the bond material can include a total content of copper oxide of not greater than 8 wt % for a total weight of the bond material, such as not greater than 7 wt % or not greater than 6 wt % or not greater than 5 wt % or not greater than 4 wt % or not greater than 3 wt % or not greater than 2 wt %. It will be appreciated that the amount copper oxide within the bond material may be within a range including any of the minimum and maximum percentages noted above.

For another aspect, the bond material may be formed to have a particular content of manganese oxide which may facilitate formation and/or performance of the abrasive article. For example, the bond material can include a total content of manganese oxide of at least 0.5 wt % for a total weight of the bond material, such as at least 1 wt % or at least 2 wt % or at least 3 wt % or at least 3.5 wt % or even at least 4 wt %. In one non-limiting embodiment, the bond material can include a total content of manganese oxide of not greater than 12 wt % for a total weight of the bond material, such as not greater than 10 wt % or not greater than 9 wt % or not greater than 8 wt % or not greater than 7 wt % or not greater than 6 wt % or not greater than 5 wt %. It will be appreciated that the amount manganese oxide within the bond material may be within a range including any of the minimum and maximum percentages noted above.

According to another embodiment, the bond material may be formed to have a particular content of nickel oxide which may facilitate formation and/or performance of the abrasive article. For example, the bond material can include a total content of nickel oxide of at least 0.2 wt % for a total weight of the bond material, such as at least 0.4 wt % or at least 0.6 wt % or at least 0.8 wt % or at least 1 wt % or even at least 1.2 wt %. In one non-limiting embodiment, the bond material can include a total content of nickel oxide of not greater than 10 wt % for a total weight of the bond material, such as not greater than 8 wt % or not greater than 6 wt % or not greater than 5 wt % or not greater than 4 wt % or not greater than 3 wt % or even not greater than 2 wt %. It will be appreciated that the amount nickel oxide within the bond material may be within a range including any of the minimum and maximum percentages noted above.

In at least one embodiment, the bond material comprises a ratio (Cs/Cm) of at least 1, wherein Cs represents the content (wt %) of silica in the bond material and Cm represents the total content of transition metal element-containing oxide compounds in the bond material. Use of a bond material having a particular ratio (Cs/Cm) may facilitate suitable formation and/or performance of the abrasive article. According to one embodiment, the ratio (Cs/Cm) is at least 2 or at least 3 or at least 4 or at least 5 or at least 6 or at least 7 or at least 8. In still another non-limiting embodiment, the ratio (Cs/Cm) can be not greater than 40, such as not greater than 30 or not greater than 20 or not greater than 18 or not greater than 16 or not greater than 14 or not greater than 12 or even not greater than 10. It will be appreciated that the ratio (Cs/Cm) may be within a range including any of the minimum and maximum values noted above.

The bond material may contain a specific content of zinc oxide (ZnO). For example, the content of zinc oxide within the bond material may be at least 0.05 wt % for a total weight of the bond material. In another embodiment, the bond material can contain at least about 0.08 wt % or even about 0.01 wt %. According to a non-limiting example, the amount of the zinc oxide within the bond material may be not greater than about 5 wt % or even not greater than about 1 wt %. It will be appreciated that the amount of zinc oxide within the bond material may be within a range between any of the minimum and maximum percentages noted above.

According to one embodiment, the bond material can be essentially free of certain materials, which may facilitate suitable formation and/or performance of the abrasive article. For example, the bond material can be essentially free of iron, iron-containing compounds (e.g., iron oxide), molybdenum, molybdenum-containing compounds (e.g., molybdenum oxide), zirconia, zirconia-containing compounds, strontium, strontium-containing compounds, and the like.

Figure 2A:
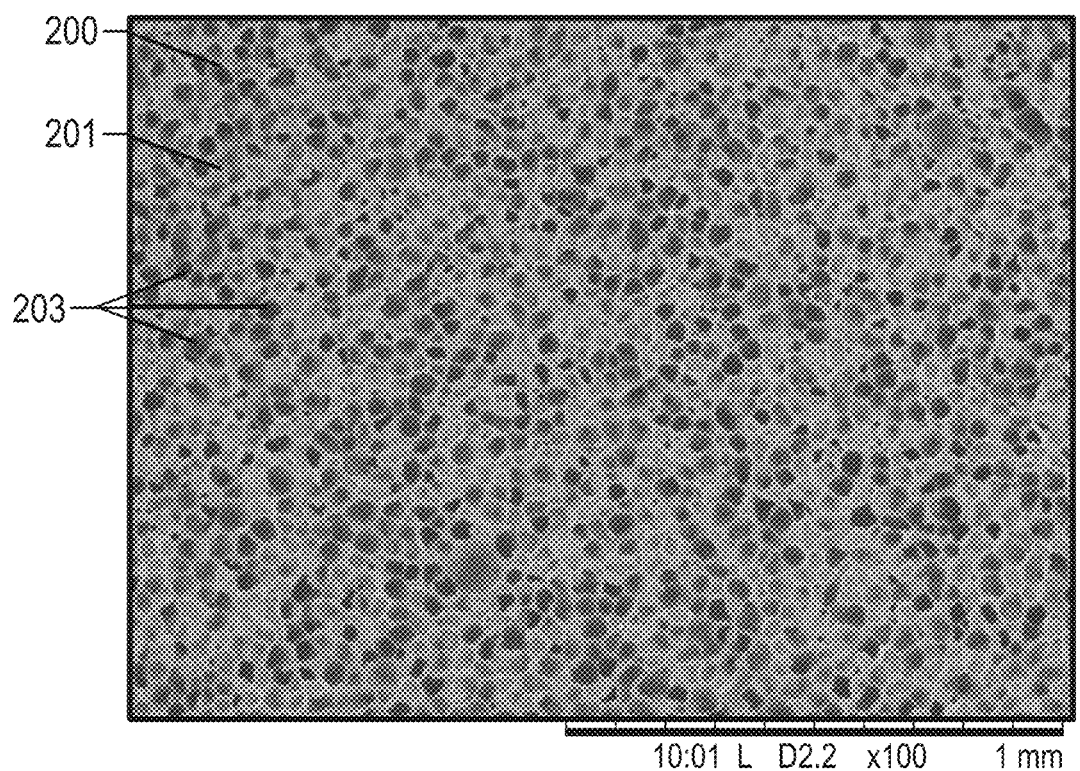
FIG. 2A includes a scanning electron microscope (SEM) image of a portion of a bonded abrasive article according to an embodiment.
Figure 2B:
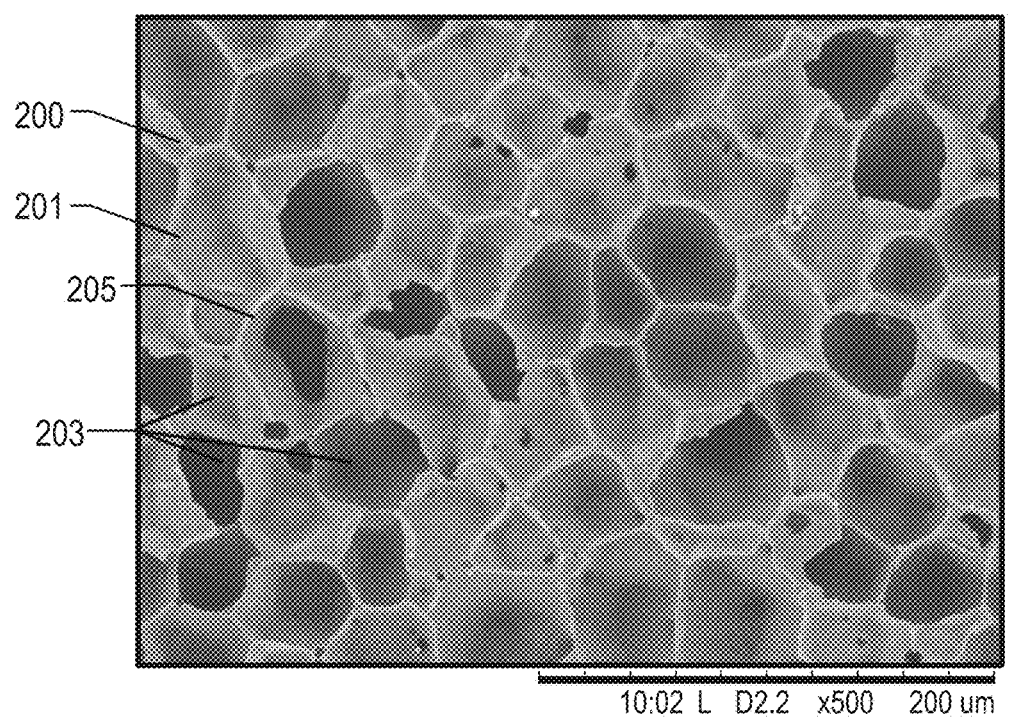
FIG. 2B includes a SEM image of a portion of a bonded abrasive article according to an embodiment.
Figure 2C:
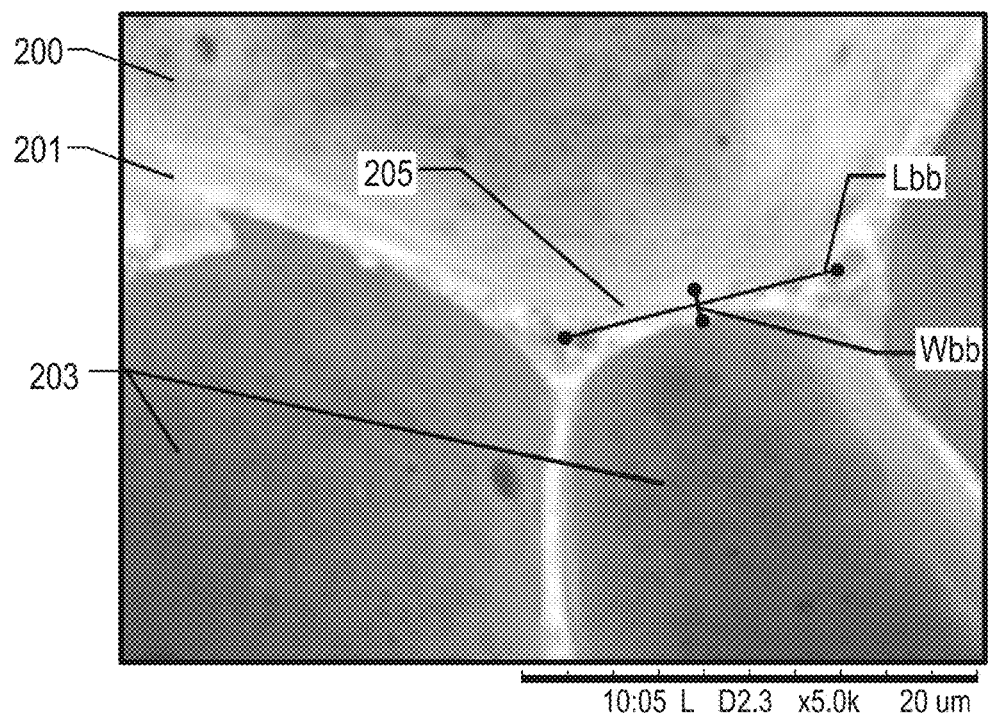
FIG. 2C includes a SEM image of a portion of a bonded abrasive article according to an embodiment.

FIGS. 2A-2C include SEM photos of a bonded abrasive body according to an embodiment. For example, as illustrated in FIGS. 2A-2C, the bonded abrasive body 200 can include a bond material 201 and pores 203 contained within the bond material. The pores 203 of the bonded abrasive body can be irregular in shape, and may not necessarily be substantially spherical as may be the case with other conventional bonded abrasives. The pores 203 can have one or more linear sections along their edges as defined by the contours of the bond bridges 205.

In particular instances, the bonded abrasive body 200 can have particularly small and substantially uniformed sized bond bridges 205, which may facilitate close packing of the pores 203 relative to each other, which may also facilitate improved performance of the abrasive body. For example, as illustrated in FIG. 2C, the bond bridge 205 can have an average width of not greater than 5 microns, which is the measure of the distance across the bond bridge 205 between two pores in a direction substantially perpendicular to the length (Lbb) of the bond bridge 205 as viewed in two-dimensions. The length (Lbb) will be understood to be the longest dimension of a bond bridge as viewed in two-dimensions. The width (Wbb) of the bond bridge is measured at a position away from the ends of the bridge as indicated by the ends of the length (Lbb), and typically within the middle half of the length near the center of the length of the bond bridge, as illustrated in FIG. 2C. The average can be calculated from a statistically relevant and random sampling of bond bridges as viewed in two-dimension at a magnification suitable for accurate measurements, such as illustrated in FIG. 2C. In one embodiment, the average width of the bond bridges can be not greater than 4, such as not greater than 3.5 or not greater than 3 or not greater than 2.8 microns or not greater than 2.5 microns or not greater than 2.2 microns or not greater than 2 microns or not greater than 1.8 microns or not greater than 1.5 microns or even not greater than 1.2 microns. Still, in at least one non-limiting embodiment, the average width of the bond bridges can be at least 0.01 microns, such as at least 0.1 microns or at least 0.5 microns or even at least 0.8 microns. It will be appreciated that the average width of the bond bridges can be within a range including any of the minimum and maximum values noted above.

Figure 8:
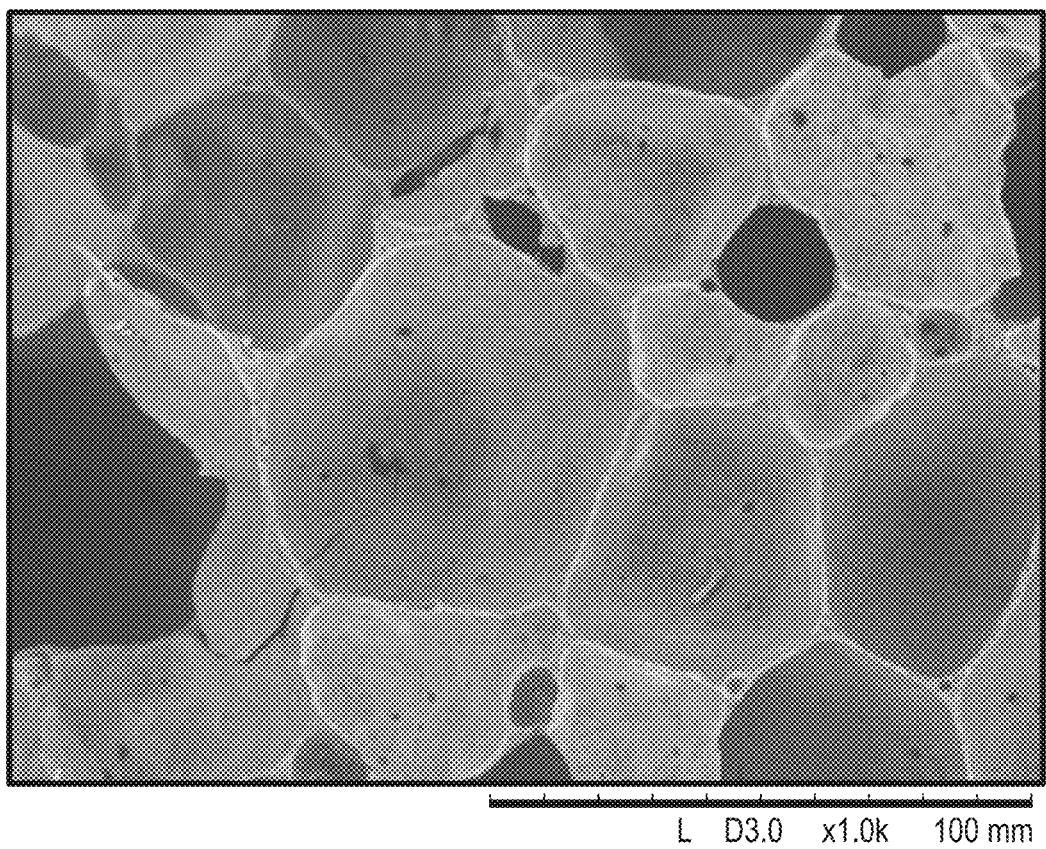
FIG. 8 includes a cross-sectional illustration of a portion of a bonded abrasive article according to an embodiment used to measure bond bridge widths and develop a bond bridge width distribution for the bonded abrasive article.

The bond bridges can be measured using a scanning electron microscope (SEM) photomicrograph from a randomly selected and representative portion of the bonded abrasive article. A sample is prepared in a suitable manner for viewing using a SEM in backscatter mode at a magnification of 1000× or other suitable magnification to ensure precise measurement of the bond bridges, such as provided in FIG. 8. A random and suitable sample size of bond bridges are selected and measured, noting that the width of the bond bridge is that portion of the bridge that joins two adjacent pores, typically within the middle half of the length of the bond bridge, such as noted in FIG. 2C. Image analysis software (e.g., ImageJ) can be used to measure the width of the bond bridges. The measured widths of the bond bridges are used to quantify the bond bridge size distribution of the bonded abrasive article, which can be used to derive the average bond bridge width, first standard deviation of bond bridge width, $90^{th}$ percentile range of widths, and the like.

Similar to the porosity, the width of the bond bridges measured from a random and statistically relevant sample size can be defined by a distribution plot of bond bridge measured width versus frequency. Based upon this distribution plot, the bond bridges of the embodiments herein can have a first standard deviation of width of not greater than 10 microns, such as not greater than 9 microns or not greater than 8 microns or not greater than 7 microns or not greater than 6 microns or not greater than 5 microns or not greater than 4 microns or not greater than 3 microns or not greater than 2 microns or not greater than 1.8 microns or not greater than 1.6 microns or not greater than 1.5 microns or not greater than 1.4 microns or not greater than 1.2 microns or not greater than 1 micron or not greater than 0.8 microns. Still, in another embodiment, the a first standard deviation of width of the bond bridges can be at least 0.01 microns, such as at least 0.05 microns or at least 0.1 microns. It will be appreciated that the first standard deviation of width of the bond bridges can be within a range including any of the minimum and maximum values noted above, including for example, at least 0.01 microns and not greater than 1.6 microns or at least 0.01 microns and not greater than 1.5 microns or even at least 0.01 microns and not greater than 1 micron.

Moreover, the width of the bond bridges measured from a random and statistically relevant sample size can be defined by a distribution plot of bond bridge measured width versus frequency. Based upon this distribution plot, the bond bridges of the embodiments herein can have a $90^{th}$ percentile range defining the range of bond bridge widths in the distribution excluding the lowest 5% of width values and greatest 5% of width values. In one embodiment, the bond bridges of the bonded abrasive article can have a bond bridge $90^{th}$ percentile range of not greater than 10 microns, such as not greater than 9 microns or not greater than 8 microns or not greater than 7 microns or not greater than 6 microns or not greater than 5 microns or not greater than 4 microns or not greater than 3 microns or not greater than 2 microns or not greater than 1.6 microns or not greater than 1.4 microns or not greater than 1.2 microns or not greater than 1.1 microns or not greater than 1 micron or not greater than 0.9 microns or not greater than 0.8 microns or not greater than 0.7 microns or not greater than 0.6 microns. Still, in another embodiment, the $90^{th}$ percentile range can be at least 0.01 microns or at least 0.05 microns or at least 0.1 microns. It will be appreciated that the $90^{th}$ percentile range for the width of the bond bridges can be within a range including any of the minimum and maximum values noted above, including for example, at least 0.01 microns and not greater than 1.2 microns or at least 0.01 microns and not greater than 1 micron or even at least 0.01 microns and not greater than 0.9 microns.

As further illustrated, due to the size or the bond bridges 205 and the close packing of the pores 203, the bond bridges do not typically have smaller, closed porosity contained therein, which may be present in other conventional bonded abrasive articles.

For one embodiment, the process of converting at least a portion of the superabrasive material to a gaseous phase material can include converting a portion of a diamond material to a non-diamond carbon-phase material. Suitable examples of a non-diamond carbon-phase material can include graphite.

In specific instances, the bond material may be formed to have a particular linear coefficient of thermal expansion (CTE) to facilitate the formation of a bonded abrasive body having the features described herein. For example, the bond material can have a linear coefficient with thermal expansion as measured at 300° C. of at least 9 ppm/° C., such as at least 10 ppm/° C., or even at least about 12 ppm/° C. In other embodiments, the coefficient of thermal expansion of the bond material may be less, such as not greater about 50 ppm/° C., not greater than about 40 ppm/° C., not greater than 30 ppm/° C., or even not greater than about 20 ppm/° C. It will be appreciated that the coefficient of thermal expansion within the bond material may be within a range between any of the minimum and maximum values noted above.

In particular instances, the bonded abrasive body can be formed such that the bond material and abrasive particles have a specific difference in coefficient of thermal expansion (ΔCTE). The specific difference in CTE may facilitate formation of the bonded abrasive body having the features describes herein. For example, the difference in CTE between the bond material and abrasive particles may be not at least 4 ppm/° C., such as at least about 5 ppm/° C. or even at least about 6 ppm/° C. However, according to one non-limiting example, the difference in CTE between the bond material and the abrasive particles may be not greater than 25 ppm/° C., not greater than about 20 ppm/° C., not greater than 15 ppm/° C., or even not greater than about 10 ppm/° C. It will be appreciated that the difference in coefficient of thermal expansion between the bond material and the abrasive particles may be within a range between any of the minimum and maximum values noted above.

Figure 9:
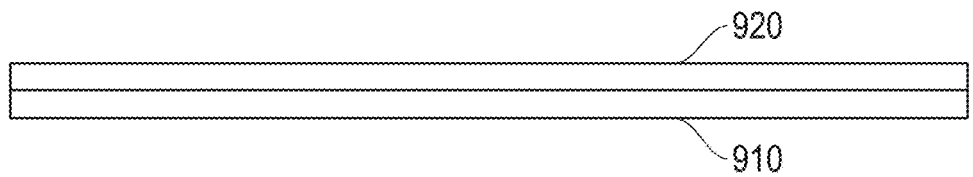
FIG. 9 includes an illustration of a smooth semiconductor wafer with tape on one side to induce circuitry.
Figure 10:
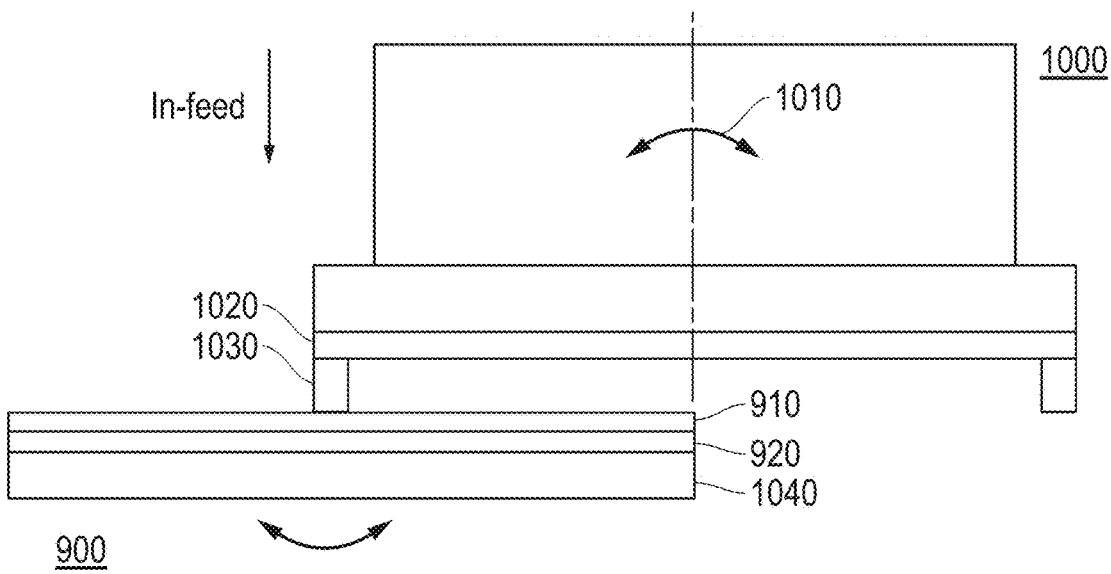
FIG. 10 includes an illustration of a grinding apparatus for grinding a smooth semiconductor wafer with tape on one side to induce circuitry.

According to particular embodiments, abrasive articles formed as described herein may be used in backgrinding operations conducted on particular types of semiconductor wafers. For example, abrasive articles formed according to embodiments described herein may be used in the backgrinding of smooth semiconductor wafers. FIG. 9 includes an illustration of a smooth semiconductor wafer 900. As shown in FIG. 9, a smooth semiconductor wafer 900 may include a semiconductor wafer back-side 910, which may also be referred to as the grinding side of the smooth semiconductor wafer 900 and a grinding tape 920 overlying a surface of the semiconductor wafer backside 910. FIG. 10 includes an illustration of a grinding apparatus 1000 for grinding a smooth semiconductor wafer 900. As show in FIG. 10, a grinding apparatus 1000 may include a spindle 1010, a preform 1020 attached to the spindle 1010 and a grinding segment 1030 attached to the preform 1020. The grinding segment 1030 may be an abrasive article formed according to embodiments described herein. As further shown in FIG. 10, during a backgrinding operation, the smooth semiconductor wafer 900 may be located between a chuck 1040 and the grinding segment 1030 so that when the grinding apparatus 1000 is in operation, the grinding segment 1030 grinds the semiconductor wafer backside 910.

Without wishing to be bound to a particular theory, a bonded abrasive article having low bond content and a low force per grit may be beneficial in the backgrinding of smooth semiconductor wafers as disclosed herein due to the increased life span of the bonded abrasive article. Again without wishing to be bound to a particular theory, an abrasive article formed according to embodiments described herein having relatively high abrasive particle content may have decreased wheel wear when operating in a backgrinding operation. According to particular embodiments, an abrasive article formed as described herein and having a relative high abrasive particle content may have a content of abrasive particles of at least about 25 vol % for a total volume of the solid portion of the bonded abrasive body, such as, at least about 26 vol %, at least about 27 vol. %, at least about 28 vol % or even at least about 29 vol. %.

Figure 11:
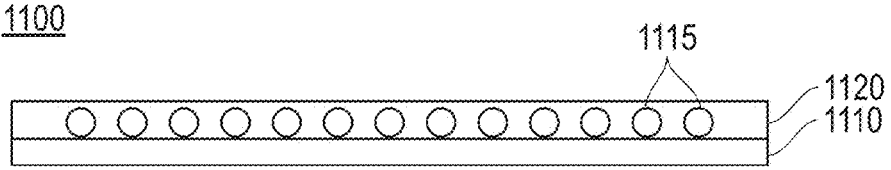
FIG. 11 includes an illustration of a bumped semiconductor wafer with tape on one side to induce circuitry.
Figure 12:
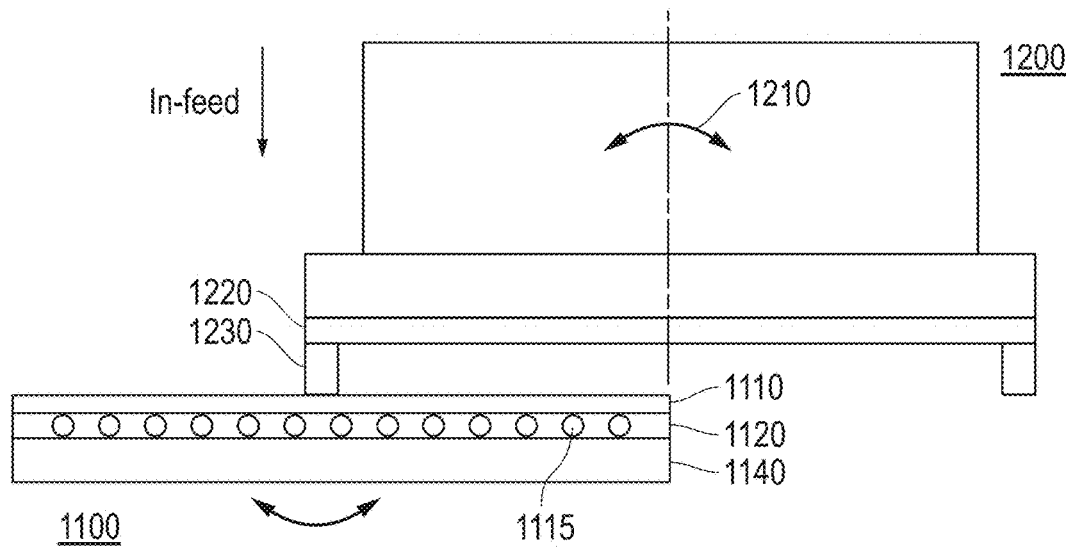
FIG. 12 includes an illustration of a grinding apparatus for grinding a bumped semiconductor wafer with tape on one side to induce circuitry.

According to still other embodiments, abrasive articles formed as described herein may be used in the backgrinding of bumped semiconductor wafers. FIG. 11 includes an illustration of a bumped semiconductor wafer 1100. As shown in FIG. 11, a bumped semiconductor wafer 1100 may include a semiconductor wafer back-side 1110, which may also be referred to as the grinding side of the bumped semiconductor wafer 1100, a plurality of bumps 1115 on a surface of the semiconductor wafer back-side 1110 and a grinding tape 1120 overlying the bumps 1115 and the surface of the semiconductor wafer backside 1110. According to certain instances, the bumped semiconductor wafer 1100 may include an interlayer (not shown) located between the grinding tape 1120 and the semiconductor wafer back-side 1110. FIG. 12 includes an illustration of a grinding apparatus 1200 for grinding a bumped semiconductor wafer 1100. As show in FIG. 12, a grinding apparatus 1200 may include a spindle 1210, a preform 1220 attached to the spindle 1210 and a grinding segment 1230 attached to the preform 1220. The grinding segment 1230 may be an abrasive article formed according to embodiments described herein. As further shown in FIG. 12, during a backgrinding operation, the bumped semiconductor wafer 1200 may be located between a chuck 1240 and the grinding segment 1230 so that when the grinding apparatus 1200 is in operation, the grinding segment 1230 grinds the semiconductor wafer backside 1210.

It will be appreciated that bumped semiconductor wafers have different thickness and different types of grinding tapes than smooth semiconductor wafers, which changes the stiffness of the entire system during backgrinding operations. Without wishing to be bound to a particular theory, a bonded abrasive article having self-dressing capability may be beneficial in the backgrinding of bumped semiconductor wafers as disclosed herein. Again, without wishing to be bound to a particular theory, an abrasive article formed according to embodiments described herein having relatively low abrasive particle content may have self-dressing capability. According to particular embodiments, an abrasive article formed as described herein and having a relatively low content of abrasive particles may have a content of abrasive particles of not greater than about 20 vol % for a total volume of the solid portion of the bonded abrasive body, such as, not greater than about 19 vol %, not greater than about 18 vol. %, not greater than about 17 vol. % or even not greater than about 16 vol. %.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. An abrasive article comprising:

a body including:

a bond material comprising a inorganic material;

abrasive particles contained within the bond materials; and
    pores contained within the bond material defining a porosity of at least 90 vol % and not greater than 97 vol % for a total volume of the body.

Embodiment 2. An abrasive article comprising:

a body including:

a bond material comprising an inorganic material;

abrasive particles contained within the bond materials; and
    pores contained within the bond material defining a porosity of at least 90 vol % and not greater than 97 vol % for a total volume of the body, wherein the pores have an mean pore size of less than 100 microns.

Embodiment 3. An abrasive article comprising:
a body including:
a bond material comprising an inorganic material;
abrasive particles contained within the bond materials; and
  pores contained within the bond material defining a porosity of at least 90 vol % and not greater than 97 vol % for a total volume of the body, and wherein the pores define an open-to-closed ratio of at least 1.

Embodiment 4. An abrasive article comprising:
a body including:
bond material comprising an inorganic material;
abrasive particles contained within the bond material;
pores contained within the bond material defining a porosity of at least 70 vol % and not greater than 97 vol % a mean pore size of not greater than 100 microns and a first standard deviation of pore sizes of not greater than 40.

Embodiment 5. An abrasive article comprising:
a body including:
bond material comprising an inorganic material;
abrasive particles contained within the bond material;
pores contained within the bond material defining a porosity of at least 70 vol % and not greater than 97 vol % for a total volume of the body; and a 90th percentile range extending for a range of pore sizes not greater than 30 microns.

Embodiment 6. An abrasive article comprising:
a body including:
a bond material comprising an inorganic material;
pores contained within the bond material having an mean pore size of less than 100 microns; and abrasive particles in a content of not greater than 30 vol % for a total volume of the body.

Embodiment 7. An abrasive article comprising:
a body including:
a bond material comprising an inorganic material including silica and a plurality of transition metal elements;
a porosity of at least 70 vol % for a total volume of the body; and pores contained within the bond material having an mean pore size of less than 100 microns.

Embodiment 8. The abrasive article of any one of embodiments 1, 2, 3, 4, 5, 6, and 7, wherein the bond material includes a vitreous material, polycrystalline material, monocrystalline material, or a combination thereof.

Embodiment 9. The abrasive article of any one of embodiments 1, 2, 3, 4, 5, 6, and 7, wherein the bond material includes an oxide compound.

Embodiment 10. The abrasive article of any one of embodiments 1, 2, 3, 4, 5, 6, and 7, wherein the bond material is essentially free of a metal material or organic material.

Embodiment 11. The abrasive article of any one of embodiments 1, 2, 3, 4, 5, 6, and 7, wherein the bond material consists essentially of a vitreous material.

Embodiment 12. The abrasive article of any one of embodiments 1, 2, 3, 4, 5, 6, and 7, wherein the bond material includes silica ($SiO_2$) in an amount of at least 40 wt % for a total weight of the bond material or at least 45 wt % or at least 50 wt % or at least 52 wt % or at least 54 wt % or at least 56 wt % or at least 58 wt % or at least 60 wt %.

Embodiment 13. The abrasive article of any one of embodiments 1, 2, 3, 4, 5, 6, and 7, wherein the bond material includes silica ($SiO_2$) in an amount of not greater than 80 wt % for a total weight of the bond material or not greater than 75 wt % or not greater than 70 wt % or not greater than 68 wt % or not greater than 66 wt % or not greater than 64 wt % or not greater than 62 wt %.

Embodiment 14. The abrasive article of any one of embodiments 1, 2, 3, 4, 5, 6, and 7, wherein the bond material includes alumina ($Al_2O_3$) in an amount of at least 0.2 wt % for a total weight of the bond material or at least 0.4 wt % or at least 0.6 wt % or at least 0.8 wt % or at least 1 wt %.

Embodiment 15. The abrasive article of any one of embodiments 1, 2, 3, 4, 5, 6, and 7, wherein the bond material includes alumina ($Al_2O_3$) in an amount of not greater than 10 wt % for a total weight of the bond material or not greater than 8 wt % or not greater than 6 wt % or not greater than 5 wt % or not greater than 4 wt % or not greater than 3 wt % or not greater than 2 wt %.

Embodiment 16. The abrasive article of any one of embodiments 1, 2, 3, 4, 5, 6, and 7, wherein the bond material includes boron oxide ($B_2O_3$) in an amount of at least 2 wt % for a total weight of the bond material or at least 4 wt % or at least 6 wt % or at least 8 wt % or at least 10 wt % or at least 12 wt %.

Embodiment 17. The abrasive article of any one of embodiments 1, 2, 3, 4, 5, 6, and 7, wherein the bond material includes boron oxide ($B_2O_3$) in an amount of not greater than 25 wt % for a total weight of the bond material or not greater than 18 wt % or not greater than 16 wt % or not greater than 15 wt % or not greater than 14 wt %.

Embodiment 18. The abrasive article of any one of embodiments 1, 2, 3, 4, 5, 6, and 7, wherein the bond material includes at least one alkali metal-containing oxide compound of potassium oxide, sodium oxide, lithium oxide, rubidium oxide, cesium oxide, or a combination thereof.

Embodiment 19. The abrasive article of embodiment 18, wherein the bond material includes a total content of the at least one alkali-metal containing oxide compound of at least 2 wt % for a total weight of the bond material or at least 4 wt % or at least 6 wt % or at least 8 wt % or at least 10 wt % or at least 12 wt %.

Embodiment 20. The abrasive article of embodiment 18, wherein the bond material includes potassium oxide, sodium oxide, and lithium oxide.

Embodiment 21. The abrasive article of embodiment 20, wherein the bond material includes a greater content of potassium oxide than a content of lithium oxide.

Embodiment 22. The abrasive article of embodiment 20, wherein the bond material includes a greater content of sodium oxide than a content of lithium oxide.

Embodiment 23. The abrasive article of embodiment 20, wherein the bond material includes a greater content of sodium oxide than a content of potassium oxide.

Embodiment 24. The abrasive article of embodiment 20, wherein the bond material includes a total content of potassium oxide of at least 0.5 wt % for a total weight of the bond material or at least 0.8 wt % or at least 1 wt % or at least 1.5 wt % or at least 2 wt % or at least 3 wt % or at least 4 wt %.

Embodiment 25. The abrasive article of embodiment 20, wherein the bond material includes a total content of potassium oxide of not greater than 10 wt % for a total weight of the bond material or not greater than 8 wt % or not greater than 6 wt % or not greater than 5 wt %.

Embodiment 26. The abrasive article of embodiment 20, wherein the bond material includes a total content of sodium oxide of at least 0.5 wt % for a total weight of the bond material or at least 0.8 wt % or at least 1 wt % or at least 1.5 wt % or at least 2 wt % or at least 3 wt % or at least 4 wt % or at least 5 wt % or at least 6 wt % or at least 7 wt % or at least 8 wt % or at least 9 wt %.

Embodiment 27. The abrasive article of embodiment 20, wherein the bond material includes a total content of sodium oxide of not greater than 20 wt % for a total weight of the bond material or not greater than 18 wt % or not greater than 16 wt % or not greater than 14 wt % or not greater than 12 wt % or not greater than 10 wt %.

Embodiment 28. The abrasive article of embodiment 20, wherein the bond material includes a total content of lithium oxide of at least 0.2 wt % for a total weight of the bond material or at least 0.3 wt % or at least 0.4 wt % or at least 0.5 wt %.

Embodiment 29. The abrasive article of embodiment 20, wherein the bond material includes a total content of lithium oxide of not greater than 8 wt % for a total weight of the bond material or not greater than 6 wt % or not greater than 4 wt % or not greater than 2 wt % or not greater than 1.5 wt % or not greater than 1 wt %.

Embodiment 30. The abrasive article of embodiment 20, wherein the bond material includes at least one transition metal element-containing oxide compound of chromium oxide, cobalt oxide, copper oxide, iron oxide, manganese oxide, molybdenum oxide, nickel oxide, titanium oxide, zinc oxide, or a combination thereof.

Embodiment 31. The abrasive article of embodiment 30, wherein the bond material includes a total content of the at least one transition metal element-containing oxide compound of at least 2 wt % for a total weight of the bond material or at least 3 wt % or at least 4 wt % or at least 5 wt % or at least 6 wt % or at least 7 wt %.

Embodiment 32. The abrasive article of embodiment 30, wherein the bond material includes a total content of the at least one transition metal element-containing oxide compound of not greater than 30 wt % for a total weight of the bond material or not greater than 20 wt % or not greater than 18 wt % or not greater than 16 wt % or not greater than 14 wt % or not greater than 12 wt %.

Embodiment 33. The abrasive article of embodiment 30, wherein the bond material includes cobalt oxide, copper oxide, manganese oxide, and nickel oxide.

Embodiment 34. The abrasive article of embodiment 33, wherein the bond material includes a greater content of cobalt oxide than a content of copper oxide.

Embodiment 35. The abrasive article of embodiment 33, wherein the bond material includes a greater content of cobalt oxide than a content of nickel oxide.

Embodiment 36. The abrasive article of embodiment 33, wherein the bond material includes a greater content of nickel oxide than a content of copper oxide.

Embodiment 37. The abrasive article of embodiment 33, wherein the bond material includes a greater content of manganese oxide than a content of copper oxide.

Embodiment 38. The abrasive article of embodiment 33, wherein the bond material includes a greater content of manganese oxide than a content of cobalt oxide.

Embodiment 39. The abrasive article of embodiment 33, wherein the bond material includes a greater content of manganese oxide than a content of nickel oxide.

Embodiment 40. The abrasive article of embodiment 33, wherein the bond material includes a total content of cobalt oxide of at least 0.2 wt % for a total weight of the bond material or at least 0.4 wt % or at least 0.6 wt % or at least 0.8 wt % or at least 1 wt % or at least 1.2 wt % or at least 1.4 wt %.

Embodiment 41. The abrasive article of embodiment 33, wherein the bond material includes a total content of cobalt oxide of not greater than 10 wt % for a total weight of the bond material or not greater than 8 wt % or not greater than 6 wt % or not greater than 5 wt % or not greater than 4 wt % or not greater than 3 wt % or not greater than 2 wt %.

Embodiment 42. The abrasive article of embodiment 33, wherein the bond material includes a total content of copper oxide of at least 0.2 wt % for a total weight of the bond material or at least 0.25 wt % or at least 3 wt % or at least 0.35 wt % or at least 0.4 wt % or at least 0.45 wt % or at least 5 wt % or at least 0.55 wt % or at least 0.6 wt %.

Embodiment 43. The abrasive article of embodiment 33, wherein the bond material includes a total content of copper oxide of not greater than 8 wt % for a total weight of the bond material or not greater than 7 wt % or not greater than 6 wt % or not greater than 5 wt % or not greater than 4 wt % or not greater than 3 wt % or not greater than 2 wt %.

Embodiment 44. The abrasive article of embodiment 33, wherein the bond material includes a total content of manganese oxide of at least 0.5 wt % for a total weight of the bond material or at least 1 wt % or at least 2 wt % or at least 3 wt % or at least 3.5 wt % or at least 4 wt %.

Embodiment 45. The abrasive article of embodiment 33, wherein the bond material includes a total content of manganese oxide of not greater than 12 wt % for a total weight of the bond material or not greater than 10 wt % or not greater than 9 wt % or not greater than 8 wt % or not greater than 7 wt % or not greater than 6 wt % or not greater than 5 wt %.

Embodiment 46. The abrasive article of embodiment 33, wherein the bond material includes a total content of nickel oxide of at least 0.2 wt % for a total weight of the bond material or at least 0.4 wt % or at least 0.6 wt % or at least 0.8 wt % or at least 1 wt % or at least 1.2 wt %.

Embodiment 47. The abrasive article of embodiment 33, wherein the bond material includes a total content of nickel oxide of not greater than 10 wt % for a total weight of the bond material or not greater than 8 wt % or not greater than 6 wt % or not greater than 5 wt % or not greater than 4 wt % or not greater than 3 wt % or not greater than 2 wt %.

Embodiment 48. The abrasive article of embodiment 33, wherein the bond material further comprises silica ($SiO_2$) and the bond material comprises a ratio (Cs/Cm) of at least 1, wherein Cs represents the content (wt %) of silica and Cm represents the total content of transition metal element-containing oxide compounds in the bond material, wherein the ratio (Cs/Cm) is at least 2 or at least 3 or at least 4 or at least 5 or at least 6 or at least 7 or at least 8.

Embodiment 49. The abrasive article of embodiment 33, wherein the bond material further comprises silica ($SiO_2$) and the bond material comprises a ratio (Cs/Cm) of not greater than 40, wherein Cs represents the content (wt %) of silica and Cm represents the total content of transition metal element-containing oxide compounds in the bond material, wherein the ratio (Cs/Cm) is not greater than 30 or not greater than 20 or not greater than 18 or not greater than 16 or not greater than 14 or not greater than 12 or not greater than 10.

Embodiment 50. The abrasive article of any one of embodiments 1, 2, 3, 4, 5, 6, and 7, wherein the body comprises a content of bond material of not greater than 99 vol % and at least 50 vol % for a total volume of the solid portion of the bonded abrasive body.

Embodiment 51. The abrasive article of any one of embodiments 1, 2, 3, 4, 5, 6, and 7, wherein the abrasive particles include a material selected from the group of oxides, carbides, nitrides, borides, diamond, naturally occurring minerals, synthetic materials, or a combination thereof.

Embodiment 52. The abrasive article of any one of embodiments 1, 2, 3, 4, 5, 6, and 7, wherein the abrasive particles have a Mohs hardness of at least 6 or at least 7 or at least 8 or at least 9.

Embodiment 53. The abrasive article of any one of embodiments 1, 2, 3, 4, 5, 6, and 7, wherein the abrasive particles have a density of at least 95% theoretical density or at least 96% or at least 97% or at least 98% theoretical density.

Embodiment 54. The abrasive article of any one of embodiments 1, 2, 3, 4, 5, 6, and 7, wherein the abrasive particles have a graphitized surface.

Embodiment 55. The abrasive article of any one of embodiments 1, 2, 3, 4, 5, 6, and 7, wherein the body comprises a content of abrasive particles of not greater than 50 vol % and at least 5 vol % for a total volume of the solid portion of the bonded abrasive body.

Embodiment 56. The abrasive article of any one of embodiments 6 and 7, further comprising pores contained within the bond material defining a porosity of at least 70 vol % and not greater than 97 vol % for a total volume of the body.

Embodiment 57. The abrasive article of any one of embodiments 1, 2, 3, 4, 5, and 56, wherein the porosity is not greater than 96 vol % or not greater than 95 vol % or not greater than 94 vol % or not greater than 93 vol %.

Embodiment 58. The abrasive article of any one of embodiments 1, 3, 4, 5, 6, and 7, wherein the pores have an mean pore size of less than 100 microns.

Embodiment 59. The abrasive article of any one of embodiments 2 and 58, wherein the pores have an mean pore size of less than 95 microns or less than 90 microns or less than 85 microns or less than 80 microns or less than 75 microns or less than 70 microns or less than 65 microns or less than 60 microns or less than 50 microns or less than 45 microns or less than 40 microns or less than 35 microns.

Embodiment 60. The abrasive article of any one of embodiments 2 and 58, wherein the pores have an mean pore size of at least 1 micron or at least 5 microns or at least 10 microns or at least 15 microns or at least 20 microns or at least 25 microns.

Embodiment 61. The abrasive article of any one of embodiments 1, 2, 4, 5, 6, and 7, wherein the pores define an open-to-closed ratio of at least 1.

Embodiment 62. The abrasive article of any one of embodiments 2 and 61, wherein the pores define an open-to-closed ratio of at least 1 and not greater than 30.

Embodiment 63. The abrasive article of any one of embodiments 1, 2, 3, 5, 6, and 7, wherein the body comprises a mean pore size of not greater than 100 microns and a first standard deviation of pore sizes of not greater than 40.

Embodiment 64. The abrasive article of any one of embodiments 4 and 64, wherein the porosity defines a first standard deviation of pore sizes of not greater than 38 microns or not greater than 36 microns or not greater than 34 microns or not greater than 32 microns or not greater than 30 microns or not greater than 28 microns or not greater than 26 microns or not greater than 24 microns or not greater than 22 microns or not greater than 20 microns or not greater than 18 microns or not greater than 16 microns.

Embodiment 65. The abrasive article of any one of embodiments 4 and 64, wherein the porosity defines a first standard deviation of pores sizes of at least 1 micron or at least 2 microns or at least 5 microns or at least 10 microns.

Embodiment 66. The abrasive article of any one of embodiments 1, 2, 3, 4, 6, and 7, wherein the body comprises pores contained within the bond material defining a porosity having a 90th percentile range extending for a range of pore sizes of not greater than 30 microns.

Embodiment 67. The abrasive article of any one of embodiments 5 and 67, wherein the 90th percentile range extends for a range of pore sizes of not greater than 28 microns or not greater than 26 microns or not greater than 24 microns or not greater than 22 microns or not greater than 20 microns or not greater than 18 microns or not greater than 16 microns or not greater than 14 microns or not greater than 12 micron.

Embodiment 68. The abrasive article of any one of embodiments 5 and 67, wherein the 90th percentile range extends for a range of pore sizes of at least 1 micron or at least 2 microns or at least 3 microns or at least 4 microns or at least 5 microns or at least 6 microns or at least 7 microns or at least 8 microns or at least 10 microns.

Embodiment 69. The abrasive article of any one of embodiments 1, 2, 3, 4, 5, 6, and 7, wherein the body comprises bond bridges having an average width of not greater than 3 microns or not greater than 2.8 microns not greater than 2.5 microns or not greater than 2.2 microns or not greater than 2 microns or not greater than 1.8 microns or not greater than 1.5 microns or not greater than 1.2 microns.

Embodiment 70. The abrasive article of any one of embodiments 1, 2, 3, 4, 5, 6, and 7, wherein the body comprises bond bridges having an average width of at least 0.01 microns or at least 0.1 microns or at least 0.5 microns or at least 0.8 microns.

Embodiment 71. The abrasive article of any one of embodiments 1, 2, 3, 4, 5, 6, and 7, wherein the body comprises bond bridges having a first standard deviation of width of not greater than 1.6 microns or not greater than 1.5 microns or not greater than 1.4 microns or not greater than 1.2 microns or not greater than 1 micron or not greater than 0.8 microns.

Embodiment 72. The abrasive article of any one of embodiments 1, 2, 3, 4, 5, 6, and 7, wherein the body comprises bond bridges having a first standard deviation of width of at least 0.01 microns or at least 0.05 microns or at least 0.1 microns.

Embodiment 73. The abrasive article of any one of embodiments 1, 2, 3, 4, 5, 6, and 7, wherein the body comprises a content of abrasive particles of at least 25 vol % for a total volume of the solid portion of the bonded abrasive body.

Embodiment 74. The abrasive article of any one of embodiments 1, 2, 3, 4, 5, 6, and 7, wherein the body comprises a content of abrasive particles of at least 29 vol % for a total volume of the solid portion of the bonded abrasive body.

Embodiment 75. The abrasive article of any one of embodiments 1, 2, 3, 4, 5, 6, and 7, wherein the body comprises a content of abrasive particle of not greater than about 20 vol % for a total volume of the solid portion of the bonded abrasive body.

Embodiment 76. The abrasive article of any one of embodiments 1, 2, 3, 4, 5, 6, and 7, wherein the abrasive article is configured for backginding smooth semiconductor wafers.

Embodiment 77. The abrasive article of any one of embodiments 1, 2, 3, 4, 5, 6, and 7, wherein the abrasive article is configured for backginding bumped semiconductor wafers.

Embodiment 78. The abrasive article of any one of embodiments 1, 2, 3, 4, 5, 6, and 7, wherein the abrasive article has self-dressing capability.

EXAMPLES

Example 1

A sample S1 is made according to the embodiments herein by mixing approximately 24-27 wt % of graphitized diamond particles having a median particle size of 0.2-1 microns with approximately 73-76 wt % of a frit material having the composition provided in Table 1. The sum of all components of the bond material is 100 wt %. It will be noted that for any materials that are not listed in Table 1, it may be presumed that the bond material is essentially free of such materials.

The mixture is then sieved through a 165 mesh screen 3 times. 14 weight percent of a binder system commercially available Carbowax from Dow is then added to the sieved mixture. The binder and sieved mixture are blended to thoroughly integrate the binder into the mixture to create a second mixture. The second mixture is screened once through a 20 mesh screen. The sieved second mixture is then spread to a substantially uniform height of approximately 0.25-0.5 inches on a non-stick surface and allowed to dry for 16-20 hours at room temperature at normal atmospheric conditions (i.e., 55% and 65% relative humidity). After drying, the sieved second mixture is screened once a 16 mesh screen to create a third sieved mixture.

The third sieved mixture is then cold pressed at 2-4 tons/square inch for 30 seconds to 2 minutes seconds at room temperature to form a green body. The green body is then fired through a firing cycle including heating to 490-520° C. and holding for 2-4 hours and then 650-750° C. for approximately 1-3 hours to complete a converting process and form a bonded abrasive blank. Bonded abrasive bodies are then extracted from the bonded abrasive blank.

The bonded abrasive body of sample S1 has approximately 78-82 vol % bond material for a total volume of solids, 18-22 vol % diamond abrasive particles for a total volume of solids, and 90-92 vol % porosity for the total volume of the body.

TABLE 1

| Bond Composition of Sample 1 | |
|---|---|
| Material | Wt % |
| Al2O3 | 1-5 |
| B2O3 | 10-16 |
| BaO | 0-2 |
| CaO | 0-3 |
| Fe2O3 | 0-3 |
| K2O | 1-6 |
| Li2O | 0-3 |
| MgO | 0-3 |
| Na2O | 6-13 |
| CoO | 0.5-5 |
| Cr2O3 | 0-03 |
| CuO | 0.05-4 |
| MnO2 | 1-6 |
| MoO3 | 0-3 |
| NiO | 0.5-5 |
| TiO2 | 0.05-3 |
| SiO2 | 58-66 |
| ZnO | 0-4 |
| ZrO2 | 0-3 |

Figure 3:
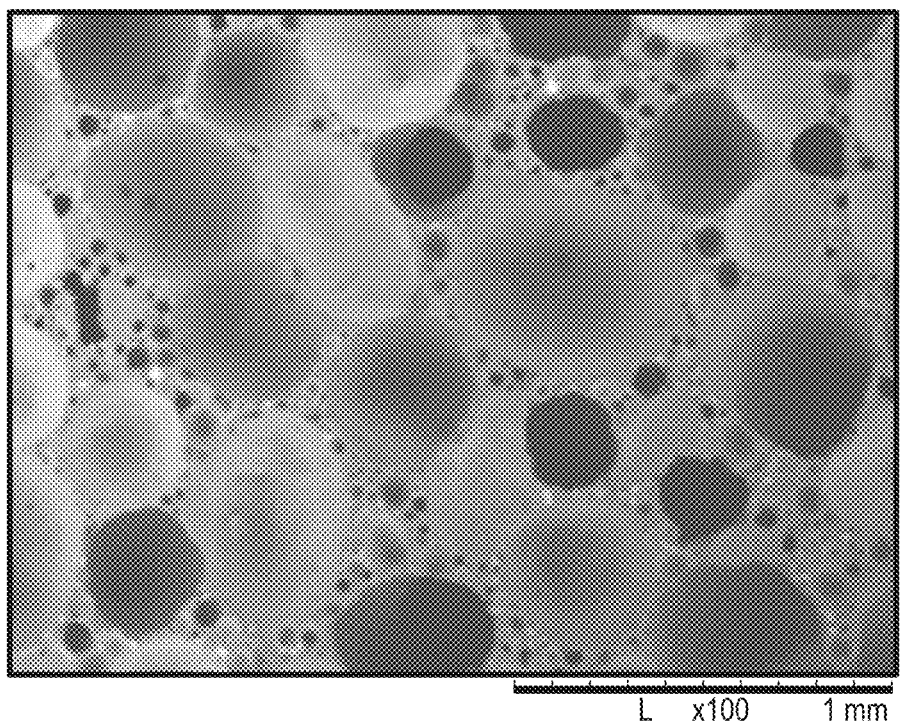
FIG. 3 includes a SEM image of a portion of a conventional bonded abrasive article.
Figure 4A:
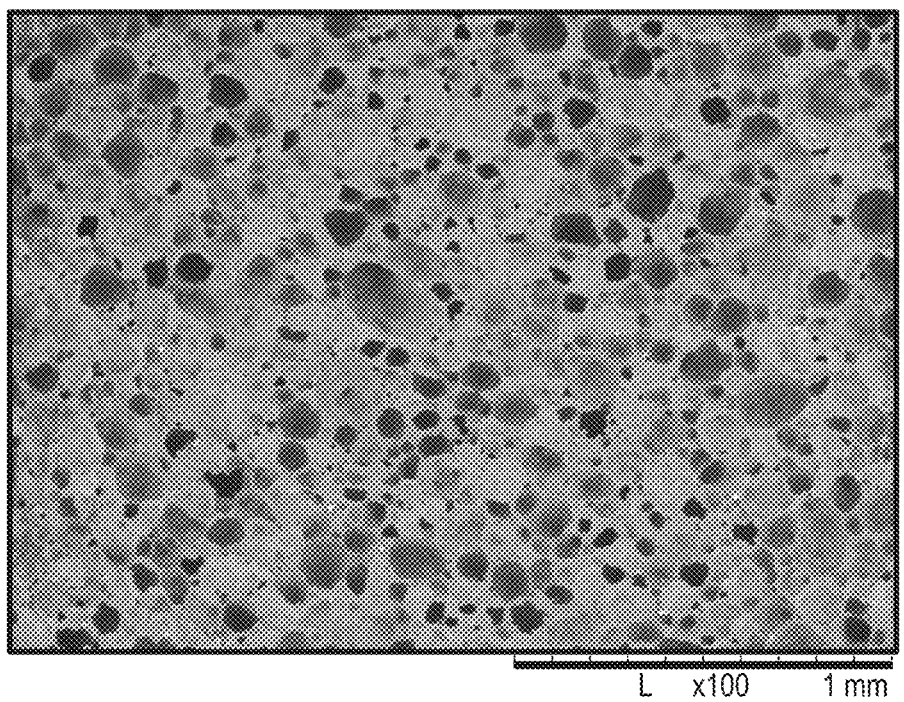
FIGS. 4A and 4B include SEM images of a portion of a conventional bonded abrasive article.
Figure 4B:
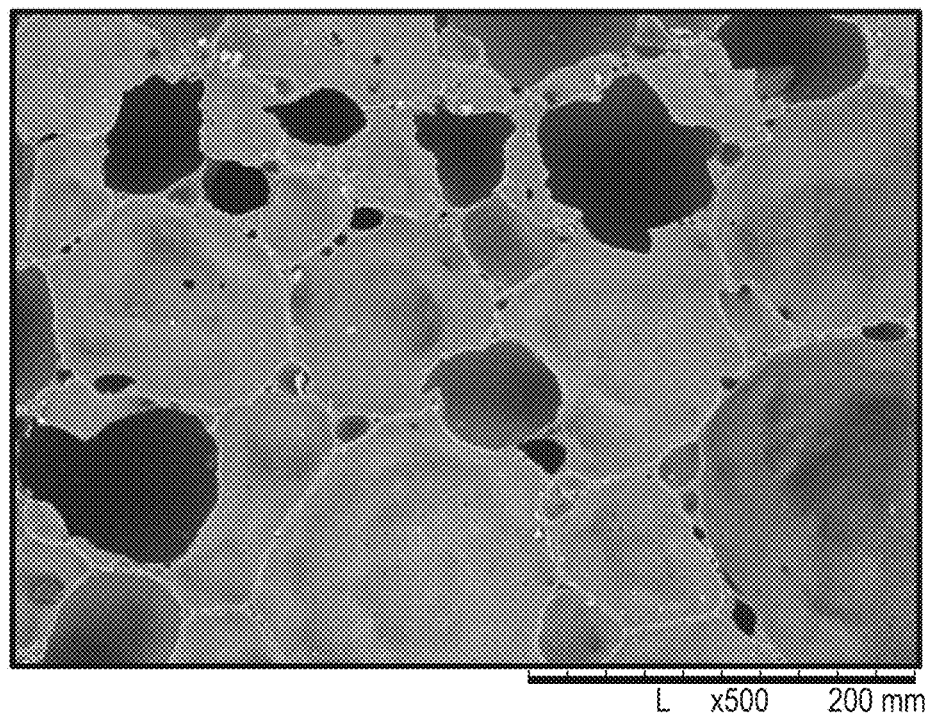

CS1 is a comparative grindstone utilized in backgrinding operations on semiconductor wafers, commercially available as Nano from Saint-Gobain Abrasives, Inc. The CS1 body includes 19 vol % diamond having a median particle size of 0.5-1 microns, 78 vol % bond material, 2 vol % $CeO_2$, 1 vol % SiC, 0 vol % $Na_2SiO_3$, and about 62-74 vol % porosity. FIG. 3 includes a cross-sectional illustration of the body of sample CS1.

CS2 is a comparative grindstone utilized in backgrinding operations on semiconductor wafers, commercially available as Poligrind from Disco Corporation. The CS2 body includes 25 wt % diamond having a median particle size of 2 microns, 25 wt % bond material, 25 wt % $Na_2SiO_3$, 25 wt % polystyrene particles, and 75-90 vol % porosity. The bond material of sample CS2 was measured via ICP and is provided in Table 2 below.

TABLE 2

| Material | Mol % |
|---|---|
| Al2O3 | 4.87 |
| B2O3 | 19.79 |
| BaO | 0 |
| CaO | 9.5 |
| Fe2O3 | 0 |
| K2O | 1.92 |
| Li2O | 0 |
| MgO | 0.31 |
| Na2O | 15.77 |
| SiO2 | 47.63 |
| ZnO | 0 |
| ZrO2 | 0 |

Figure 6:
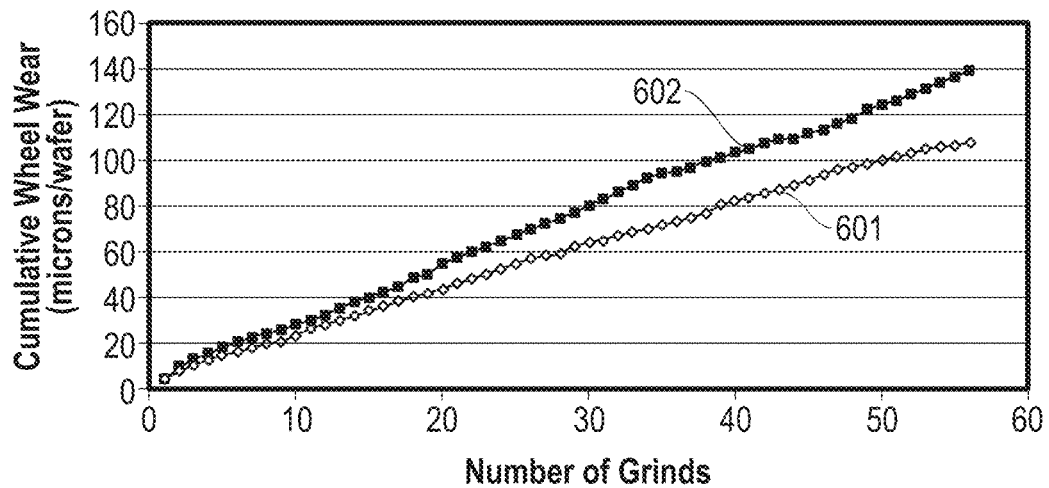
FIG. 6 includes a plot of cumulative wheel wear versus number of grinds for two samples.

Without wishing to be tied to a particular theory, it is thought that the use of particular combination of components facilitates improved wear of the bonded abrasive body over state of the art grindstone articles. Simulating a wafer surface grinding operation, on an eight inch silicon wafer using an 8 inch diameter grinding wheel using the conditions provided in Table 3. The contact area for sample S1 1332 $mm^2$ and the contact area for sample CS2 was 1872 $mm^2$. As illustrated in the plot of FIG. 6, the cumulative wheel wear for sample S1 represented by plot 601 was significantly less as compared to the cumulative wheel wear of sample CS2, represented by plot 602.

TABLE 3

| Fine Grinding | |
|---|---|
| Wheel Speed | 1700 rpm |
| Material Removed | 20 um (10, 5, 5) |
| Feed Rate | P1-0.3, P2-0.2, P3-0.1 um/s |
| Chuck Speed | 298 rpm |
| Escape thickness | 7 um |
| Spark out | 3 rev |

Example 2

Samples S2, S3 and S4 are made according to the embodiments described herein. The bonded abrasive body of sample S2 has approximately 85 vol % bond material for a total volume of solids, approximately 15 vol % diamond abrasive particles for a total volume of solids, and approximately 91-92.5 vol % porosity for the total volume of the body. The abrasive body of sample S3 has approximately 80 vol % bond material for a total volume of solids, approximately 20 vol % diamond abrasive particles for a total volume of solids, and approximately 90.5-92 vol % porosity for the total volume of the body. The abrasive body of sample S4 has approximately 70 vol % bond material for a total volume of solids, approximately 30 vol % diamond abrasive particles for a total volume of solids, and approximately 90-91.5 vol % porosity for the total volume of the body.

CS3 is a comparative grindstone utilized in backgrinding operations on semiconductor wafers, commercially available as Poligrind from Disco Corporation. The CS3 body includes 25 wt % diamond having a median particle size of 2 microns, 25 wt % bond material, 25 wt % $Na_2SiO_3$, 25 wt % polystyrene particles, and 75-90 vol % porosity.

Grinding performance for samples S2, S3, S4 and CS3 was tested using a wafer surface grinding operation on an eight inch smooth silicon wafer using an 8 inch diameter grinding wheel using the conditions provided in Table 4 below.

TABLE 4

| Fine Grinding | |
| --- | --- |
| Wheel Speed | 1700 rpm |
| Material Removed | 20 um (10, 5, 5) |
| Feed Rate | P1-0.3, P2-0.2, P3-0.1 um/s |
| Chuck Speed | 298 rpm |
| Escape thickness | 7 um |
| Spark out | 3 rev |

Figure 13:
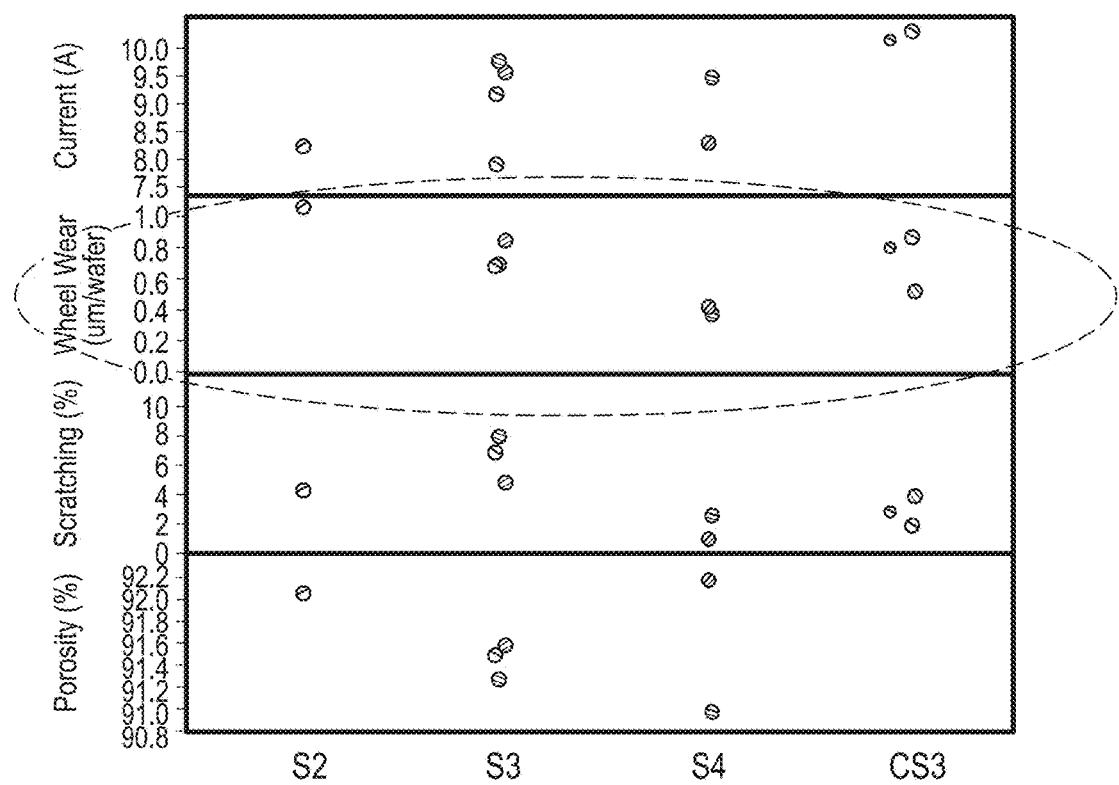
FIG. 13 includes a plot of wheel wear performance for four samples tested in a backgrinding operation.

FIG. 13 includes a plot showing wheel wear for samples S2, S3, S4 and CS3. As illustrated in the plot of FIG. 13, the wheel wear for sample S4 was less as compared to the wheel wear of samples S2, S3 and CS3. Without wishing to be tied to a particular theory, it is thought that the use of a relatively high abrasive particle content in the bonded abrasive body made according to embodiments described herein decreases wheel wear of the bonded abrasive body as compared comparative grindstone articles when used in the grinding of smooth silicon wafers. Such an decrease in wheel wear may be seen as a significant improvement over the comparative grindstone articles.

Figure 14:
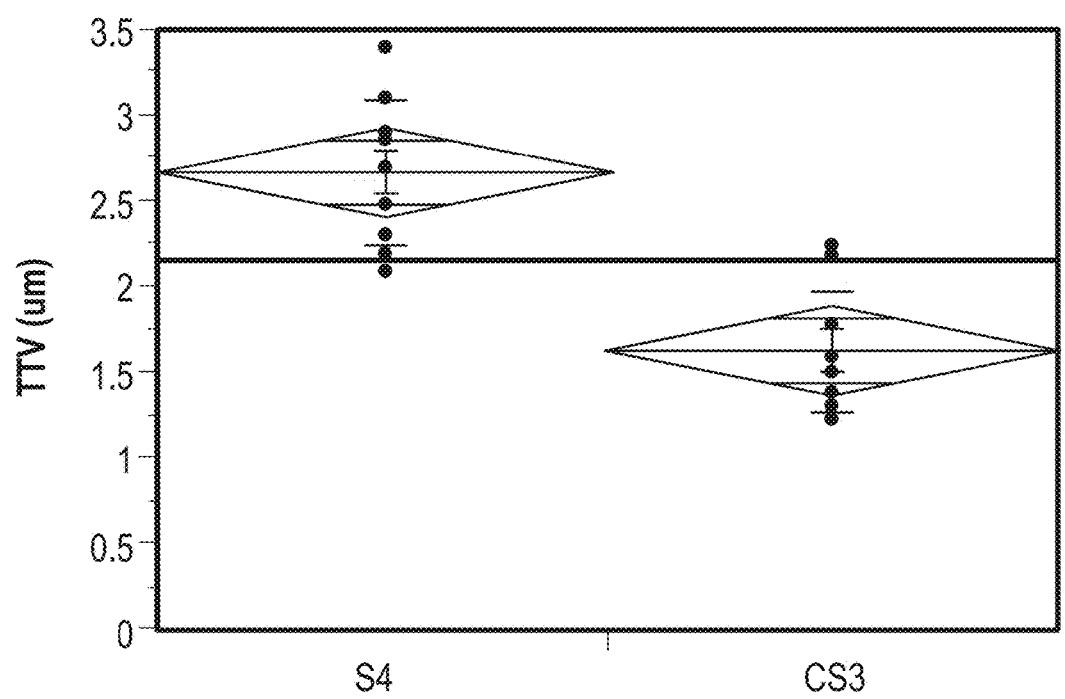
FIG. 14 includes a plot of TTV performance for two samples tested in a backgrinding operation.

FIG. 14 includes a plot showing the TTV achieved by samples S4 and CS3. As illustrated in the plot of FIG. 14, the TTV achieved by sample S4 was significantly less as compared to the TTV achieved by sample CS3. Again, without wishing to be tied to a particular theory, it is thought that the use of a relatively high abrasive particle content in the bonded abrasive body made according to embodiments described herein improves the quality of grinding (i.e., lowers the TTV) achieved by the bonded abrasive body as compared to comparative grindstone articles when used in the grinding of smooth silicon wafers.

Example 3

Samples S5 and S6 are made according to the embodiments described herein. The bonded abrasive body of sample S5 has approximately 85 vol % bond material for a total volume of solids, approximately 15 vol % diamond abrasive particles for a total volume of solids, and approximately 91-92.5 vol % porosity for the total volume of the body. The bonded abrasive body of sample S6 has approximately 70 vol % bond material for a total volume of solids, approximately 30 vol % diamond abrasive particles for a total volume of solids, and approximately 90-91.5 vol % porosity for the total volume of the body.

CS4 is a comparative grindstone utilized in backgrinding operations on semiconductor wafers, commercially available as Poligrind from Disco Corporation. The CS4 body includes 25 wt % diamond having a median particle size of 2 microns, 25 wt % bond material, 25 wt % $Na_2SiO_3$, 25 wt % polystyrene particles, and 75-90 vol % porosity.

Grinding performance for samples S5, S6 and CS4 was tested using a wafer surface grinding operation on an eight inch smooth silicon wafer using an 8 inch diameter grinding wheel using the conditions provided in Table 5 below.

TABLE 5

| Fine Grinding | |
| --- | --- |
| Wheel Speed | 1700 rpm/3000 rpm |
| Material Removed (@ 1700 rpm) | 20 µm, 25 µm, 40 µm & 100 µm |
| Material Removed (@ 3000 rpm) | 20 µm & 40 µm |
| Feed Rate (@ 1700 rpm) | P1-0.3, P2-0.2, P3-0.1 um/s |
| Feed Rate (@ 3000 rpm) | P1-0.25, P2-0.2, P3-0.2 um/s |
| Chuck Speed | 298 rpm |
| Escape thickness | 7 um |
| Spark out | 3 rev |

Figure 15:
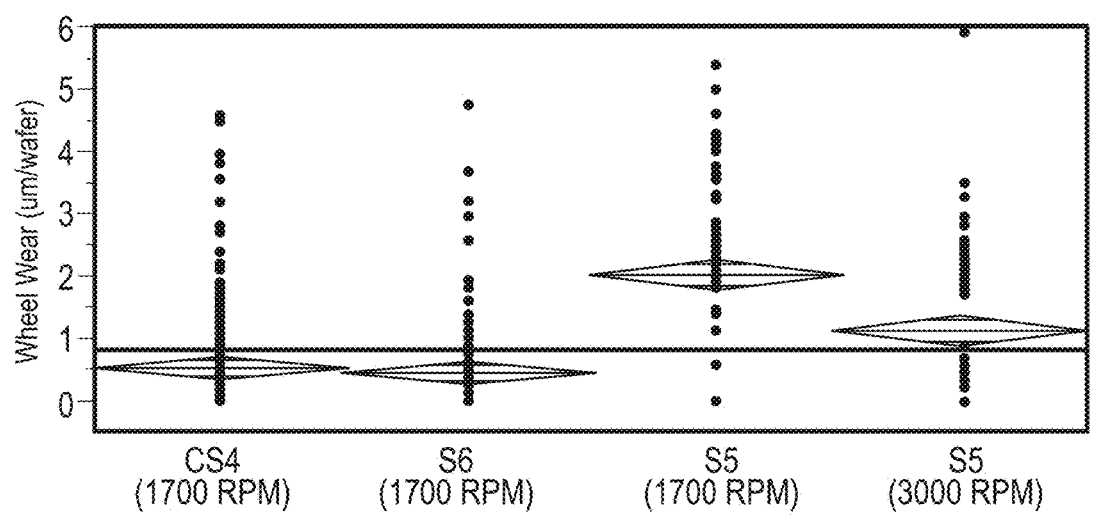
FIG. 15 includes a plot of wheel wear performance for three samples tested in a backgrinding operation.

FIG. 15 includes a plot showing wheel wear performance for samples S5, S6 and CS4. As illustrated in the plot of FIG. 15, the wheel wear for sample S5 was significantly higher as compared to the wheel wear of samples S6 and CS3. Without wishing to be tied to a particular theory, it is thought that the use of a relatively low abrasive particle concentration in the bonded abrasive body made according to embodiments described herein leads to increased wheel wear of the bonded abrasive body as compared to comparative grindstone articles when used in the grinding of smooth silicon wafers. Such an increase in wheel wear when grinding smooth silicon wafers may indicate true self-dressing capability of the bonded abrasive body. According to particular embodiments, a bonded abrasive body formed as described herein, having relatively low abrasive particle content and having self-dressing capability may improve grinding performance of the bonded abrasive body on other particular types of semiconductor wafers, for example, back grinding of bumped wafers.

The foregoing embodiments are directed to abrasive products, and particularly bonded abrasive products, which represent a departure from the state-of-the-art. The bonded abrasive products of the embodiments herein utilize a combination of features that facilitate improved grinding performance. As described in the present application, the bonded abrasive bodies of the embodiments herein utilize a particular amount and type of abrasive particles, particular amount and type of bond material, a particular amount and type of porosity, and other additives. Moreover, it was discovered that the bonded abrasive articles of the present embodiments are capable of having marked differences in certain mechanical characteristics versus some state-of-the-art conventional articles, including for example wear.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article comprising:
   a body including:
   a bond material comprising an inorganic material;
   abrasive particles contained within the bond materials; and
   pores contained within the bond material defining a porosity of at least 90 vol % and not greater than 97 vol % for a total volume of the body, and wherein the pores define an open-to-closed ratio of at least 1.

2. The abrasive article of claim 1, wherein the bond material includes a vitreous material, polycrystalline material, monocrystalline material, or a combination thereof.

3. The abrasive article of claim 1, wherein the bond material includes at least one alkali metal-containing oxide compound of potassium oxide, sodium oxide, lithium oxide, rubidium oxide, cesium oxide, or a combination thereof.

4. The abrasive article of claim 2, wherein the bond material includes potassium oxide, sodium oxide, and lithium oxide.

5. The abrasive article of claim 3, wherein the bond material includes at least one transition metal element-containing oxide compound of chromium oxide, cobalt oxide, copper oxide, iron oxide, manganese oxide, molybdenum oxide, nickel oxide, titanium oxide, zinc oxide, or a combination thereof.

6. The abrasive article of claim 4, wherein the bond material further comprises silica ($SiO_2$) and the bond material comprises a ratio (Cs/Cm) of at least 1, wherein Cs represents the content (wt %) of silica and Cm represents the total content of transition metal element-containing oxide compounds in the bond material.

7. The abrasive article of claim 1, wherein the bond material includes silica ($SiO_2$) in an amount of at least 40 wt % for a total weight of the bond material.

8. The abrasive article of claim 1, wherein the bond material includes alumina ($Al_2O_3$) in an amount of at least 0.2 wt % for a total weight of the bond material.

9. The abrasive article of claim 1, wherein the bond material includes boron oxide ($B_2O_3$) in an amount of at least 2 wt % for a total weight of the bond material.

10. The abrasive article of claim 1, wherein the body comprises a mean pore size of not greater than 100 microns and a first standard deviation of pore sizes of not greater than 40.

11. The abrasive article of claim 1, wherein the abrasive article is configured for backgrinding smooth semiconductor wafers.

12. The abrasive article of claim 1, wherein the abrasive article is configured for backgrinding bumped semiconductor wafers.

13. The abrasive article of claim 1, wherein the abrasive article has self-dressing capability.

14. The abrasive article of claim 1, wherein the bond material includes potassium oxide, sodium oxide, and lithium oxide.

15. The abrasive article of claim 14, wherein the bond material includes a greater content of potassium oxide than a content of lithium oxide.

16. The abrasive article of claim 14, wherein the bond material includes a greater content of sodium oxide than a content of lithium oxide.

17. The abrasive article of claim 14, wherein the bond material includes a greater content of sodium oxide than a content of potassium oxide.

18. The abrasive article of claim 1, wherein the abrasive particles have a Mohs hardness of at least 6.

19. The abrasive article of claim 1, wherein the abrasive particles have a density of at least 95% theoretical density.

20. The abrasive article of claim 1, wherein the abrasive particles have a graphitized surface.

* * * * *

UNITED STATES PATENT AND TRADEMARK OFFICE
CERTIFICATE OF CORRECTION

PATENT NO. : 10,213,902 B2
APPLICATION NO. : 15/205297
DATED : February 26, 2019
INVENTOR(S) : Sivasubramanian et al.

It is certified that error appears in the above-identified patent and that said Letters Patent is hereby corrected as shown below:

On the Title Page

Item (56) In the references cited under U.S. Patent Documents, second reference on the second page, please delete "Sivasubrarnanian" and insert --Sivasubramanian--

In the Specification

Column 27, Table 1, Column "Material", in row 1, please delete "Al2O3" and insert --$Al_2O_3$--

Column 27, Table 1, Column "Material", in row 2, please delete "B2O3" and insert --$B_2O_3$--

Column 27, Table 1, Column "Material", in row 5, please delete "Fe2O3" and insert --$Fe_2O_3$--

Column 27, Table 1, Column "Material", in row 6, please delete "K2O" and insert --$K_2O$--

Column 27, Table 1, Column "Material", in row 7, please delete "Li2O" and insert --$Li_2O$--

Column 27, Table 1, Column "Material", in row 9, please delete "Na2O" and insert --$Na_2O$--

Column 27, Table 1, Column "Material", in row 11, please delete "Cr2O3" and insert --$Cr_2O_3$--

Column 27, Table 1, Column "Material", in row 13, please delete "MnO2" and insert --$MnO_2$--

Column 27, Table 1, Column "Material", in row 14, please delete "MoO3" and insert --$MoO_3$--

Column 27, Table 1, Column "Material", in row 16, please delete "TiO2" and insert --$TiO_2$--

Column 27, Table 1, Column "Material", in row 17, please delete "SiO2" and insert --$SiO_2$--

Column 27, Table 1, Column "Material", in row 19, please delete "ZrO2" and insert --$ZrO_2$--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,213,902 B2

Column 28, Table 1, Column "Material", in row 1, please delete "Al2O3" and insert --$Al_2O_3$--

Column 28, Table 1, Column "Material", in row 2, please delete "B2O3" and insert --$B_2O_3$--

Column 28, Table 1, Column "Material", in row 5, please delete "Fe2O3" and insert --$Fe_2O_3$--

Column 28, Table 1, Column "Material", in row 6, please delete "K2O" and insert --$K_2O$--

Column 28, Table 1, Column "Material", in row 7, please delete "Li2O" and insert --$Li_2O$--

Column 28, Table 1, Column "Material", in row 9, please delete "Na2O" and insert --$Na_2O$--

Column 28, Table 1, Column "Material", in row 10, please delete "SiO2" and insert --$SiO_2$--

Column 28, Table 1, Column "Material", in row 12, please delete "ZrO2" and insert --$ZrO_2$--